(12) United States Patent
Ootorii

(10) Patent No.: US 11,181,698 B2
(45) Date of Patent: Nov. 23, 2021

(54) CONNECTOR AND ELECTRONIC APPARATUS

(71) Applicant: SONY SEMICONDUCTOR SOLUTIONS CORPORATION, Kanagawa (JP)

(72) Inventor: Hiizu Ootorii, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 247 days.

(21) Appl. No.: 16/301,324

(22) PCT Filed: Apr. 19, 2017

(86) PCT No.: PCT/JP2017/015660
§ 371 (c)(1),
(2) Date: Nov. 13, 2018

(87) PCT Pub. No.: WO2017/208654
PCT Pub. Date: Dec. 7, 2017

(65) Prior Publication Data
US 2019/0196116 A1  Jun. 27, 2019

(30) Foreign Application Priority Data

Jun. 1, 2016  (JP) .............................. JP2016-109980

(51) Int. Cl.
*G02B 6/38* (2006.01)
*H01R 13/516* (2006.01)
(Continued)

(52) U.S. Cl.
CPC ......... *G02B 6/3853* (2013.01); *G02B 6/3817* (2013.01); *H01R 13/516* (2013.01);
(Continued)

(58) Field of Classification Search
CPC ... G02B 6/3853; G02B 6/3817; G02B 6/3847
See application file for complete search history.

(56) References Cited

U.S. PATENT DOCUMENTS 5,943,463 A * 8/1999 Unuma ................ G02B 6/1221
385/119
9,033,590 B2 * 5/2015 Ootorii .................. H01R 27/02
385/76
(Continued)

FOREIGN PATENT DOCUMENTS

CN 103201662 A 5/2015
CN 103026557 B 6/2015
(Continued)

OTHER PUBLICATIONS

International Search Report and Written Opinion of PCT Application No. PCT/JP2017/015660, dated Jul. 18, 2017, 10 pages of ISRWO.

(Continued)

*Primary Examiner* — Sung H Pak
*Assistant Examiner* — Hoang Q Tran
(74) *Attorney, Agent, or Firm* — Chip Law Group

(57) ABSTRACT

Provided is a connector including: an electric transmitter; an optical transmitter including a lens at an end of an optical transmission path; a housing that is allowed to contain the optical transmitter; and a slide mechanism that attaches the lens to a connected unit at a position exposed from a front surface of the housing.

18 Claims, 34 Drawing Sheets

(51) Int. Cl.
*G06F 1/16* (2006.01)
*H01R 24/60* (2011.01)
*H01R 107/00* (2006.01)

(52) U.S. Cl.
CPC .......... *G02B 6/3847* (2013.01); *G02B 6/3885* (2013.01); *G06F 1/1616* (2013.01); *H01R 24/60* (2013.01); *H01R 2107/00* (2013.01)

(56) References Cited

U.S. PATENT DOCUMENTS

| | | | |
|---|---|---|---|
| 9,063,300 B2 | 6/2015 | Torikai et al. | |
| 9,091,822 B2 | 7/2015 | Demerritt et al. | |
| 10,732,361 B2* | 8/2020 | Fortusini | G02B 6/387 |
| 2002/0004336 A1* | 1/2002 | Yamaguchi | G02B 6/3897 |
| | | | 439/577 |
| 2013/0108219 A1 | 5/2013 | Ootorii et al. | |
| 2013/0129284 A1 | 5/2013 | Torikai et al. | |
| 2013/0251309 A1 | 9/2013 | Demerritt et al. | |
| 2014/0153875 A1* | 6/2014 | Bradley | G02B 6/3807 |
| | | | 385/60 |
| 2016/0154185 A1* | 6/2016 | Mori | G02B 6/4295 |
| | | | 385/56 |

FOREIGN PATENT DOCUMENTS

| | | |
|---|---|---|
| CN | 105637715 A | 6/2016 |
| CN | 103094802 B | 3/2017 |
| EP | 2638421 A1 | 9/2013 |
| JP | 2005-032648 A | 2/2005 |
| JP | 2012-054057 A | 3/2012 |
| JP | 2013-098063 A | 5/2013 |
| JP | 2015-053210 A | 3/2015 |
| JP | 2015-153609 A | 8/2015 |
| JP | 5879936 B2 | 3/2016 |
| KR | 10-2013-0031363 A | 3/2013 |
| TW | 201223037 A | 6/2012 |
| TW | 201250317 A | 12/2012 |
| TW | 201525550 A | 7/2015 |
| WO | 2012/029396 A1 | 3/2012 |
| WO | 2012/064594 A1 | 5/2012 |
| WO | 2015/033613 A1 | 3/2015 |

OTHER PUBLICATIONS

Office Action for JP Patent Application No. 2018-520707, dated Apr. 20, 2021, 5 pages of Office Action and 5 sages of English Translation.

* cited by examiner

[FIG. 1]
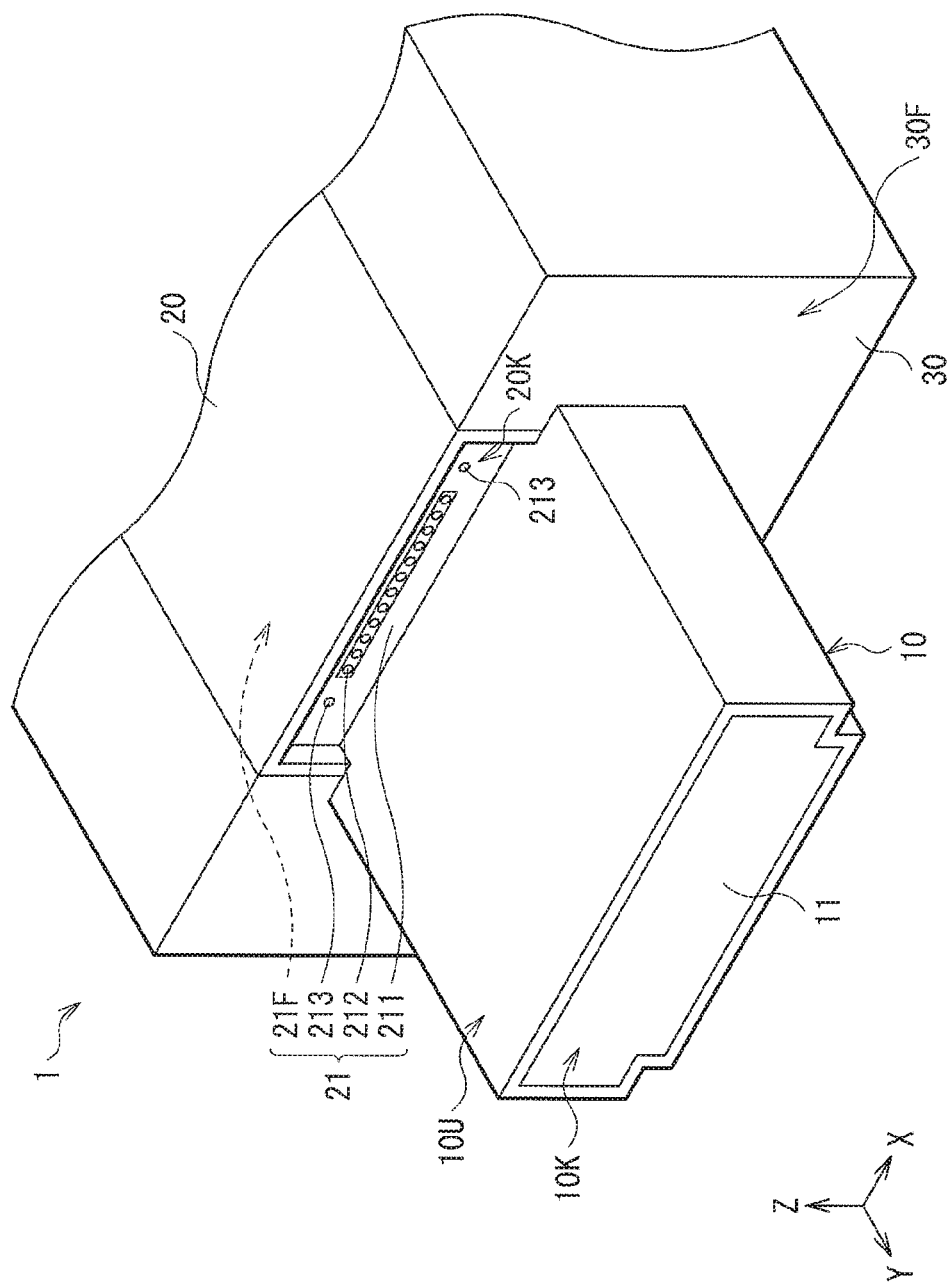

[FIG. 2]
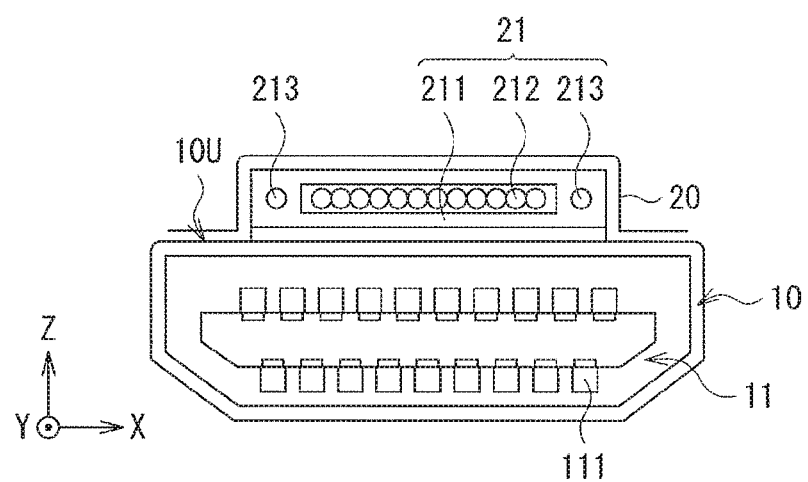

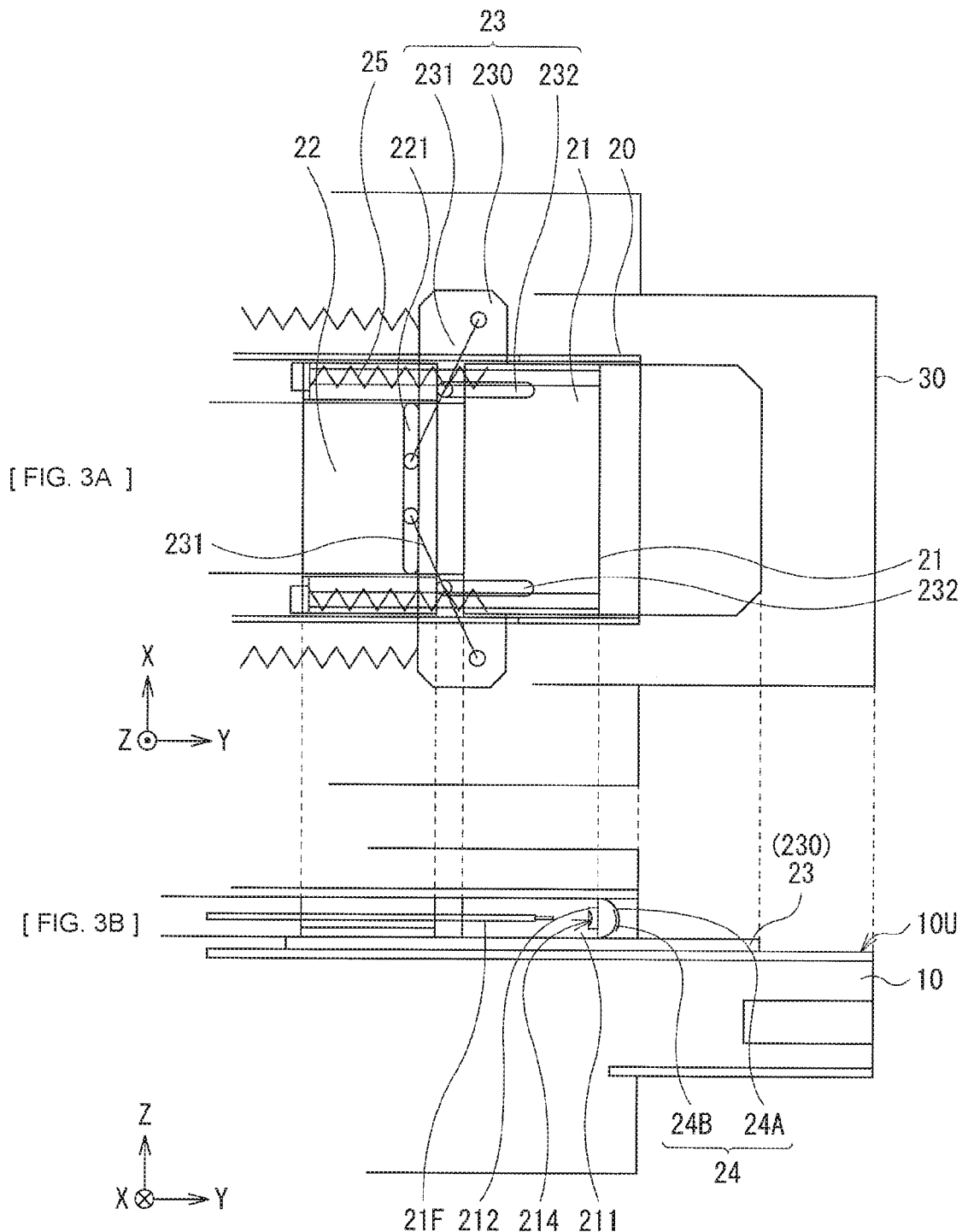

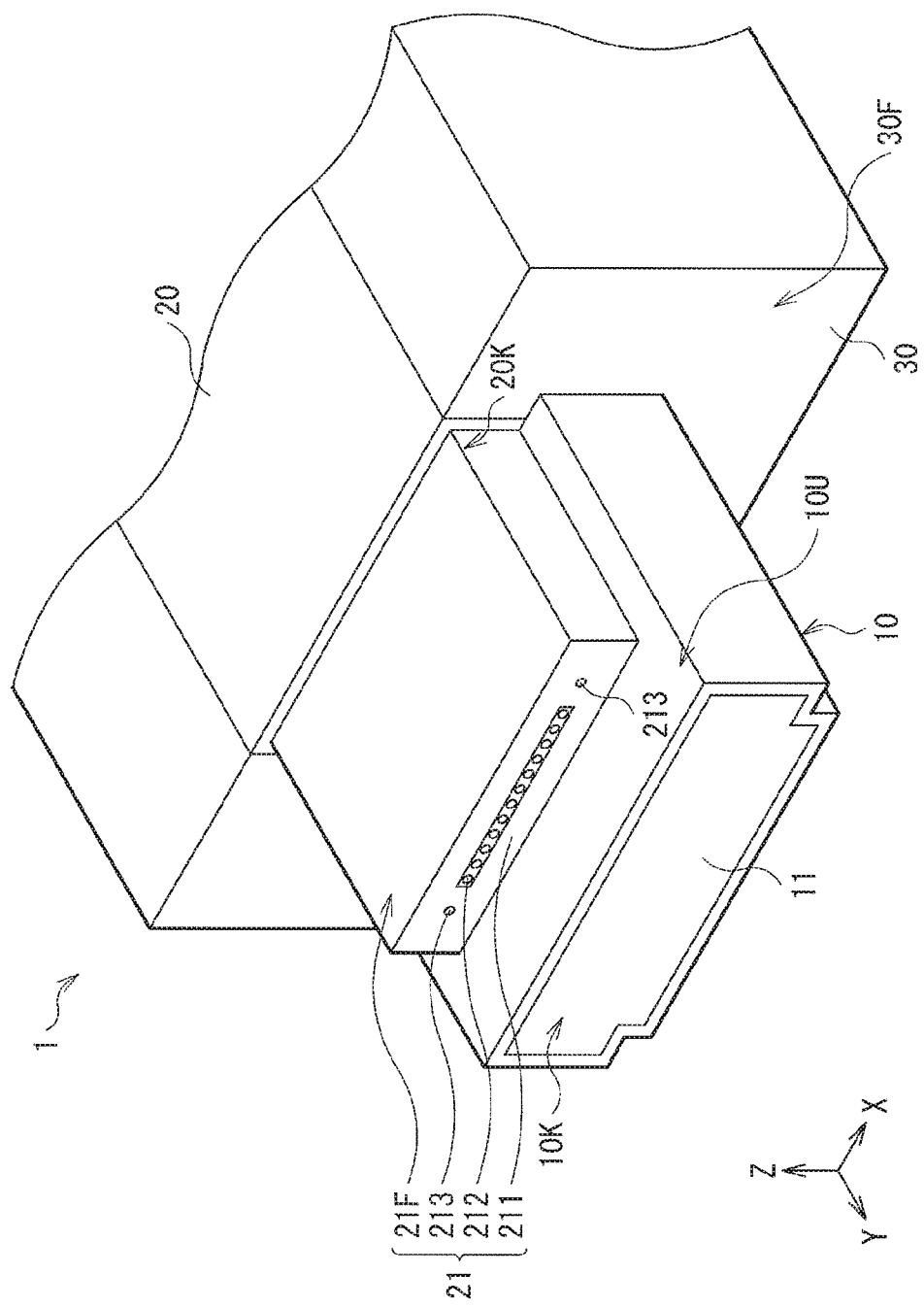
[FIG. 4]

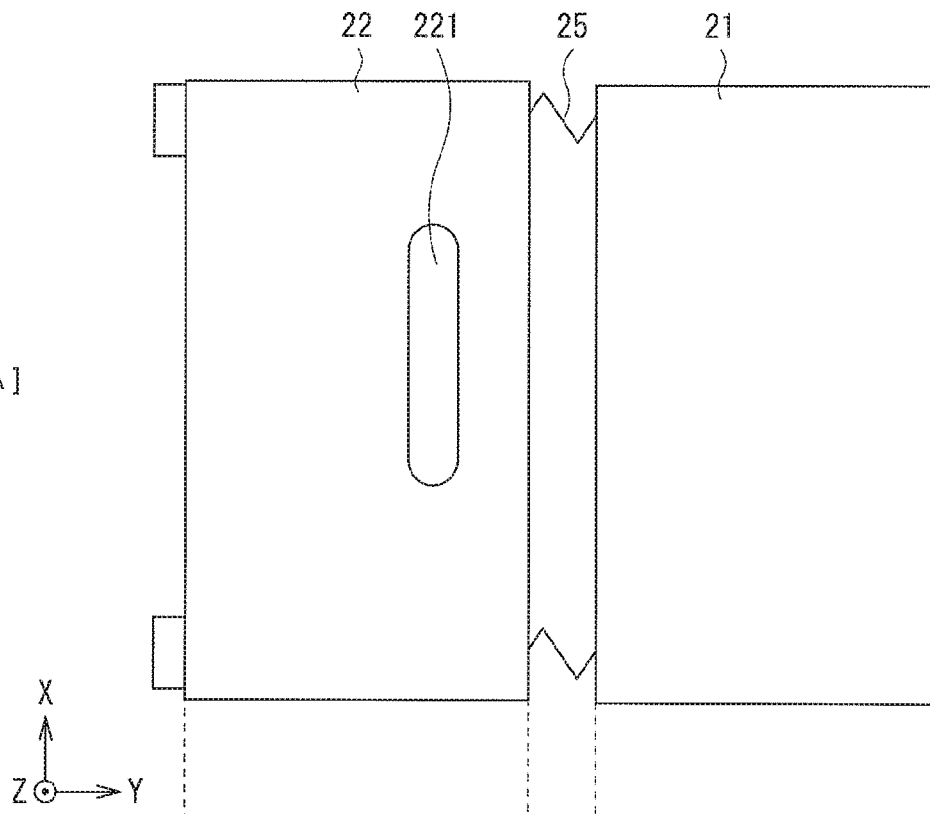
[FIG. 5A]
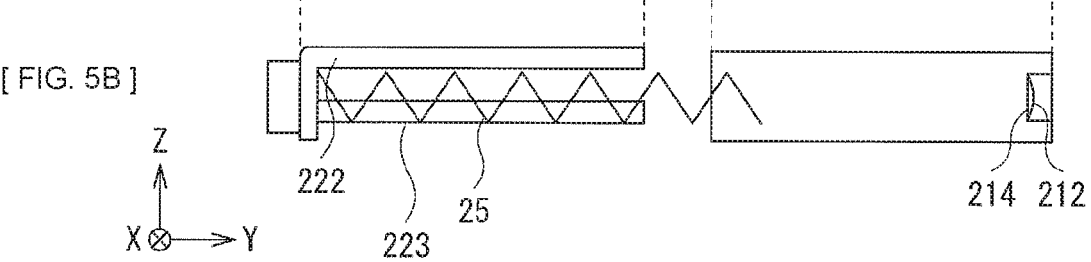
[FIG. 5B]

[FIG. 6]
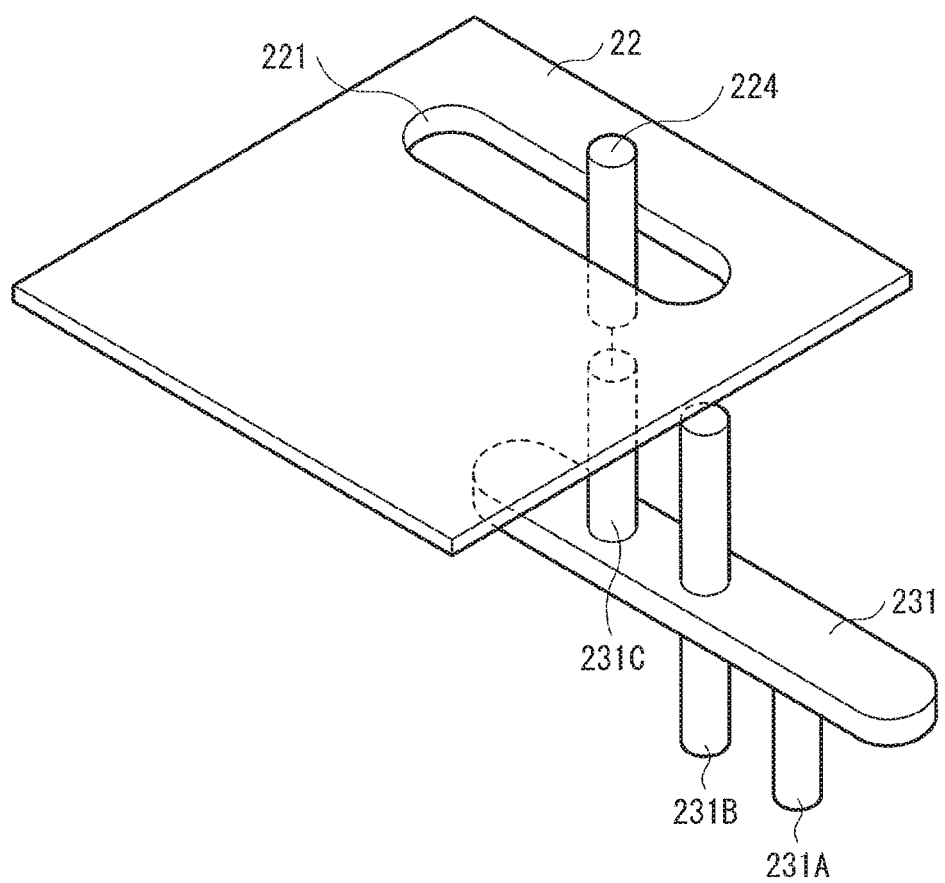

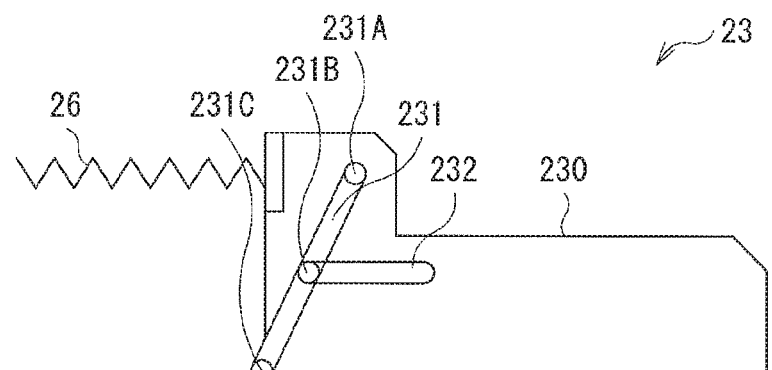

[FIG. 8]
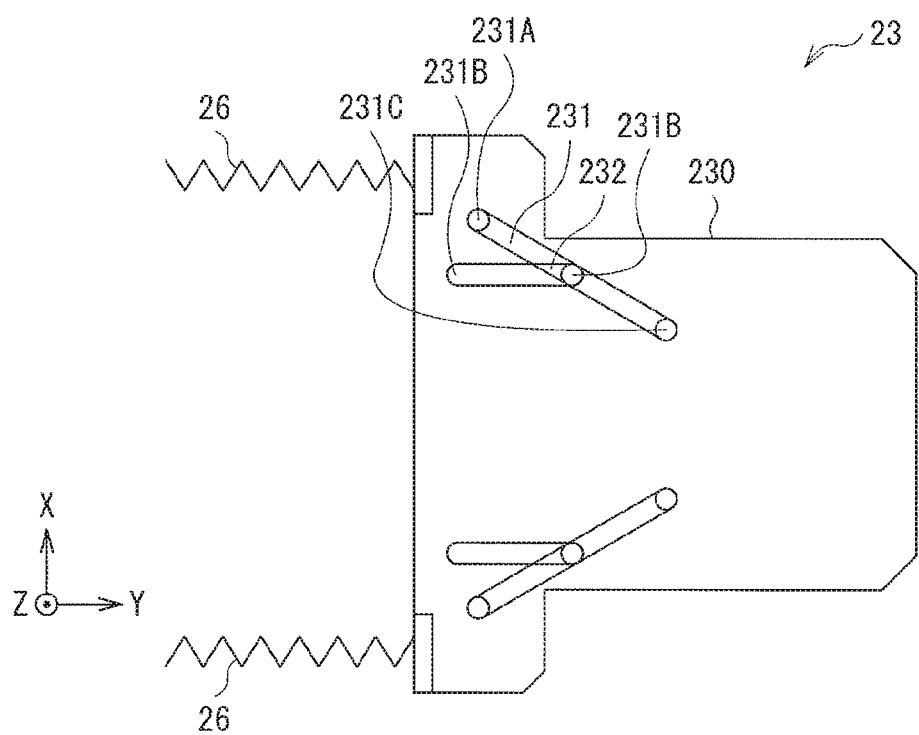

[FIG. 9]
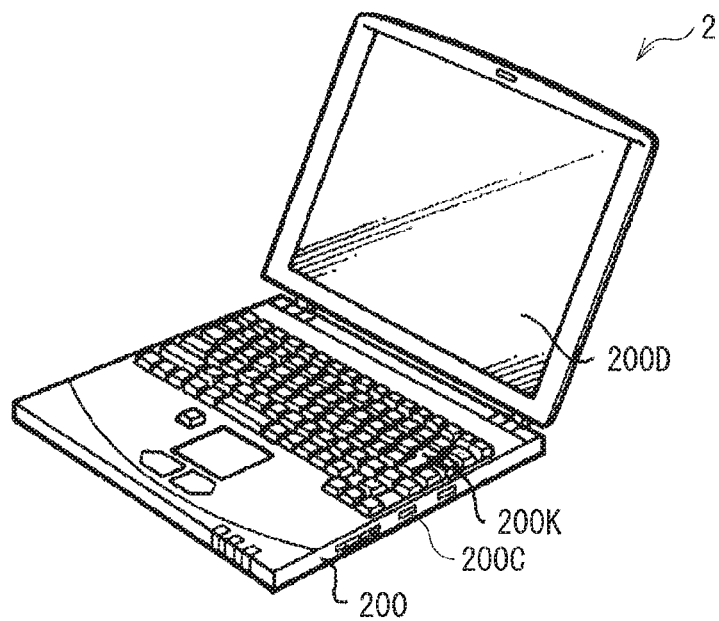
[FIG. 10]
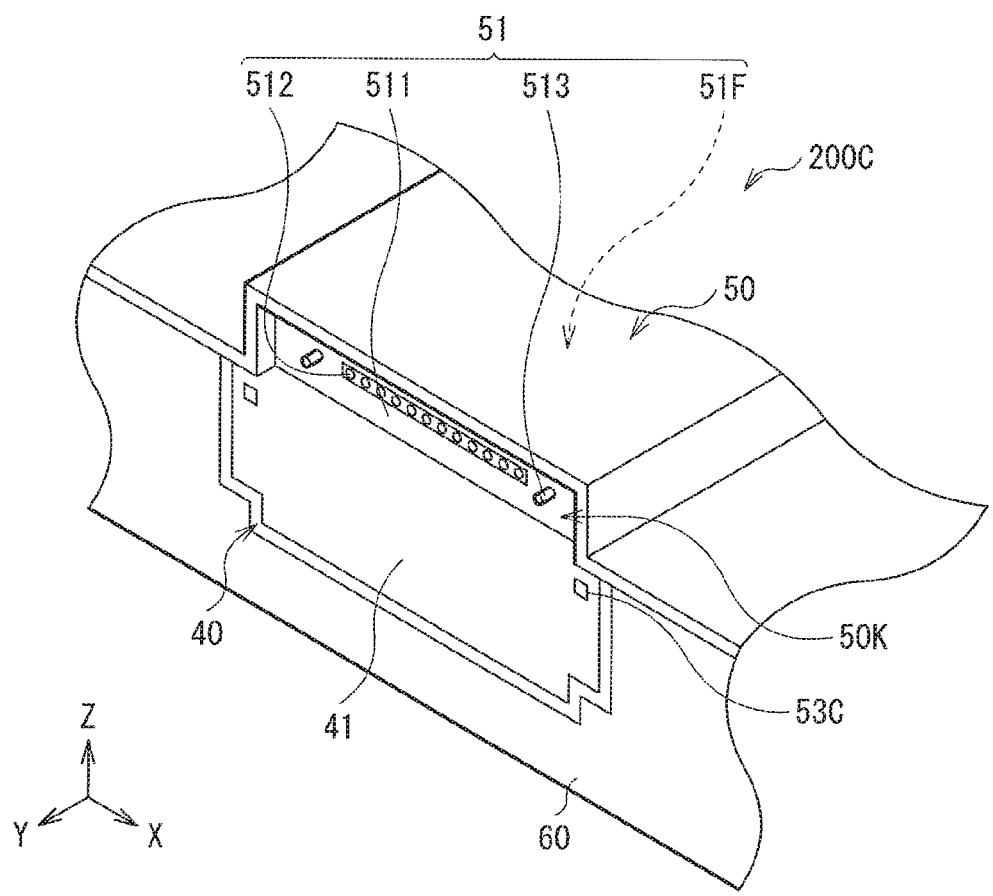

[ FIG. 11 ]
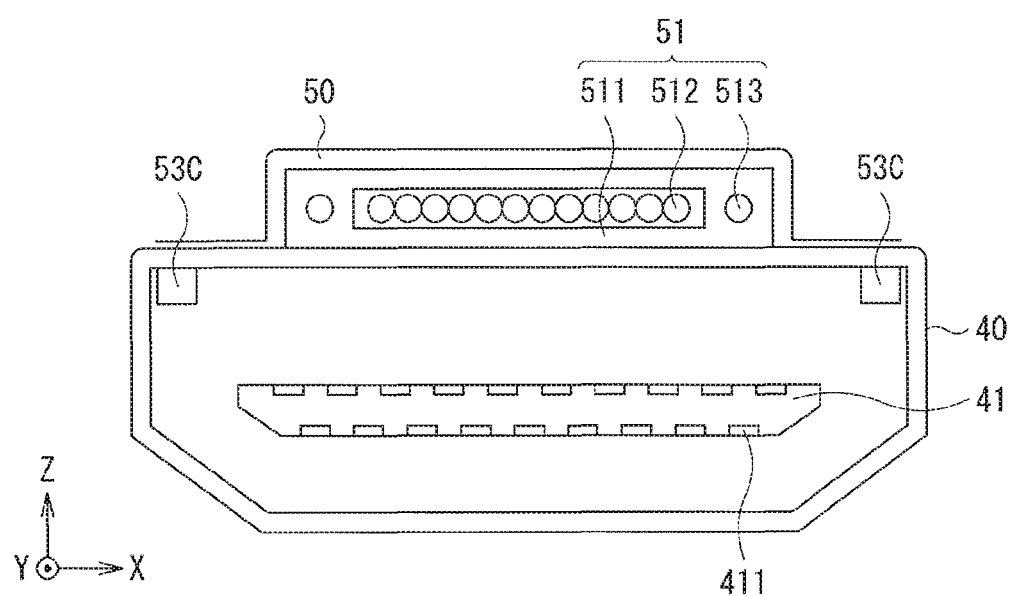

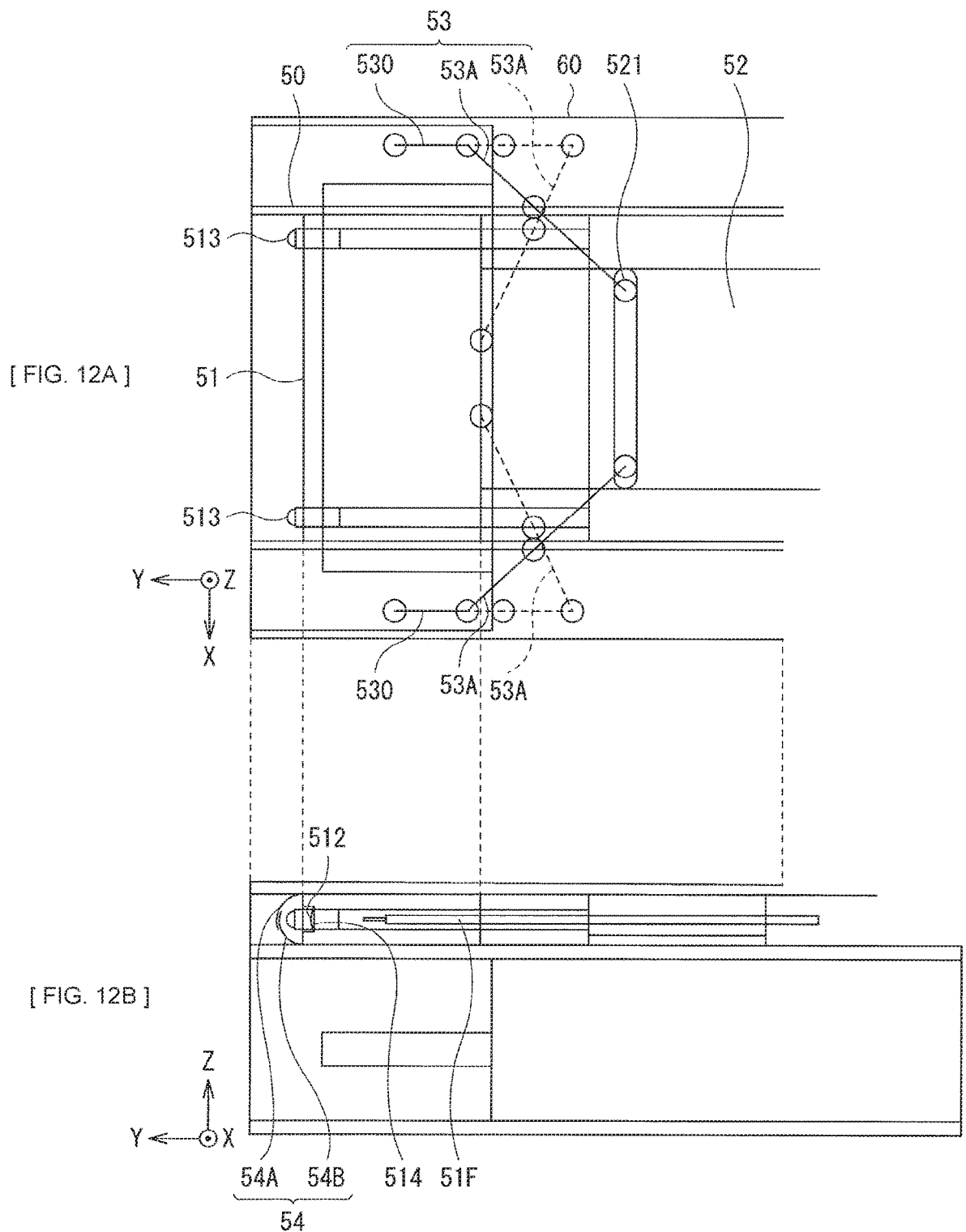

[ FIG. 13A ]
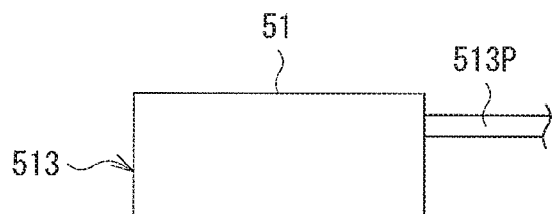
[ FIG. 13B ]
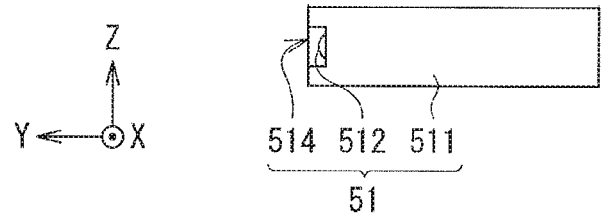
[ FIG. 14 ]
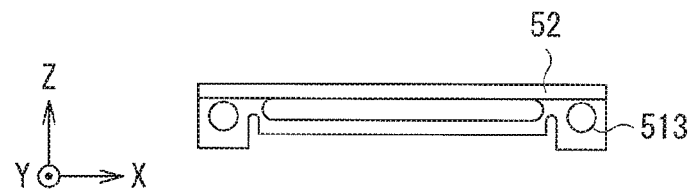

[ FIG. 15A ]
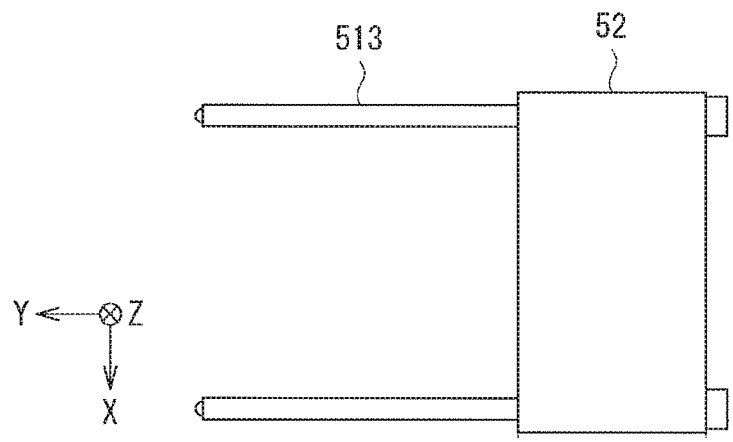
[ FIG. 15B ]
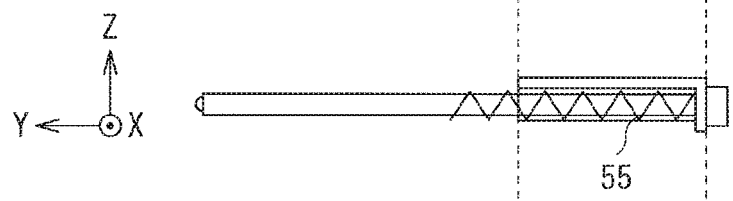
[ FIG. 15C ]
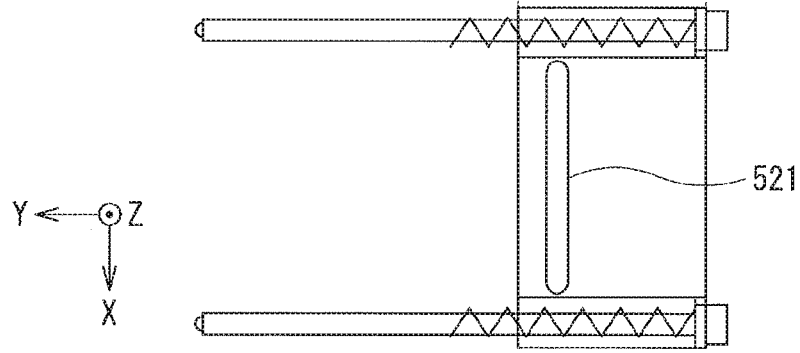

[ FIG. 16 ]
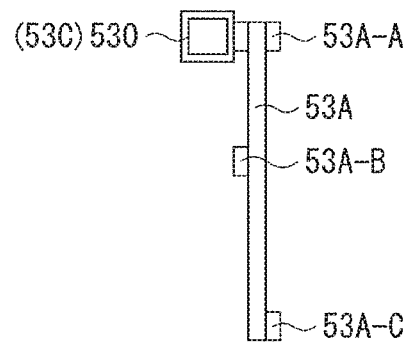
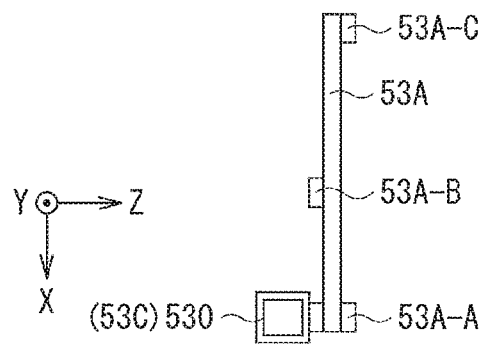
[ FIG. 17 ]
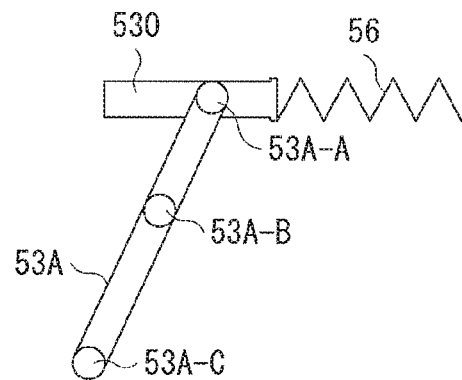
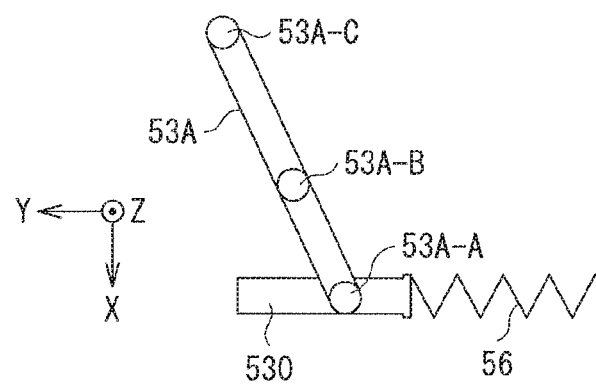

[FIG. 18A]
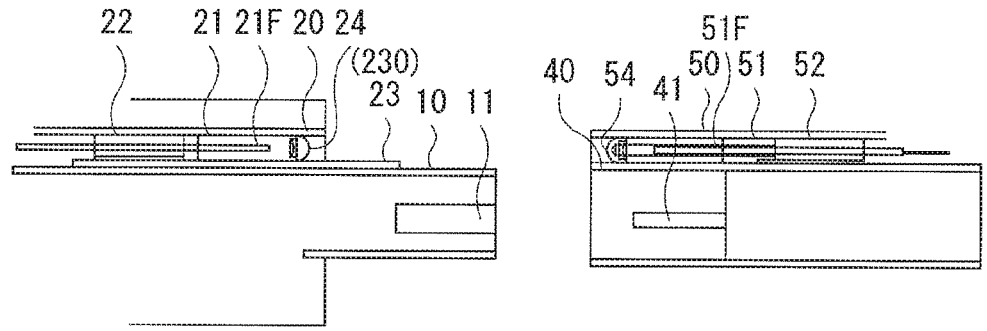
[FIG. 18B]
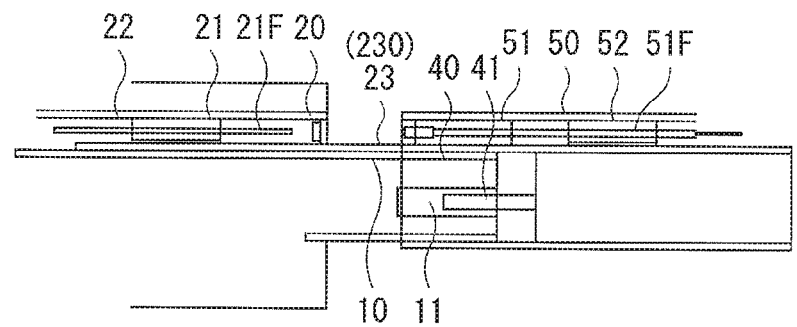
[FIG. 18C]
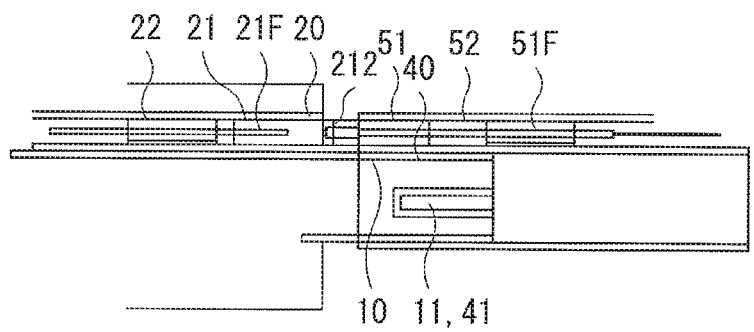
[FIG. 18D]
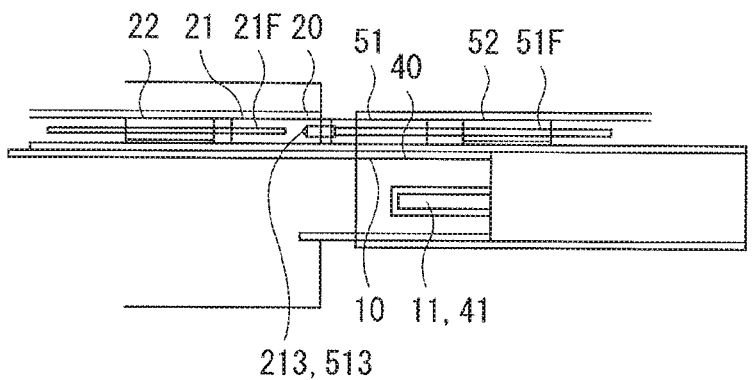

[FIG. 19A]
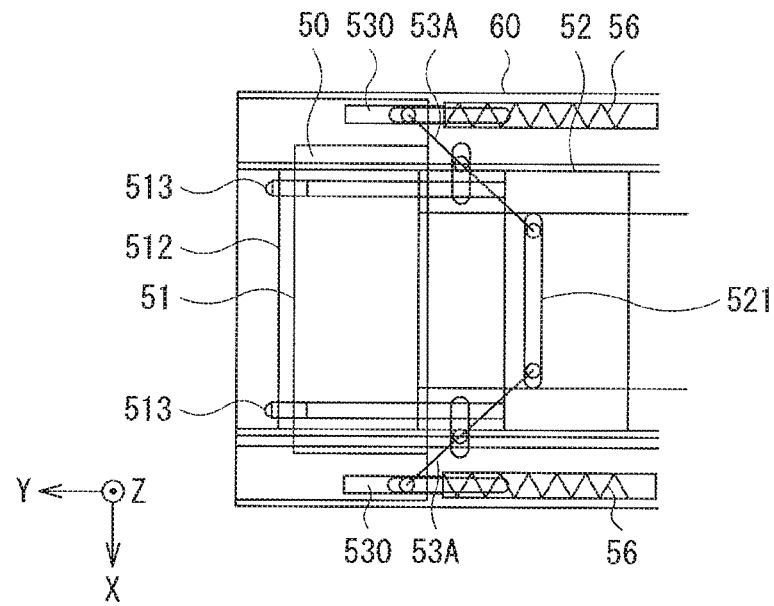
[FIG. 19B]
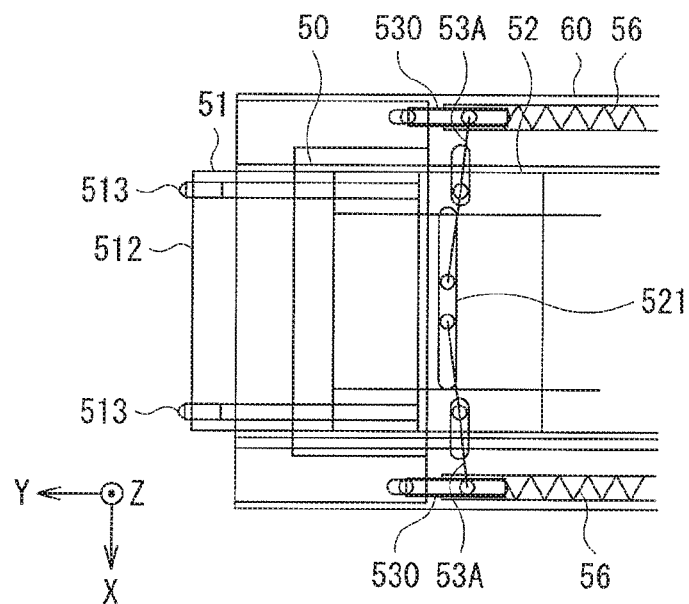

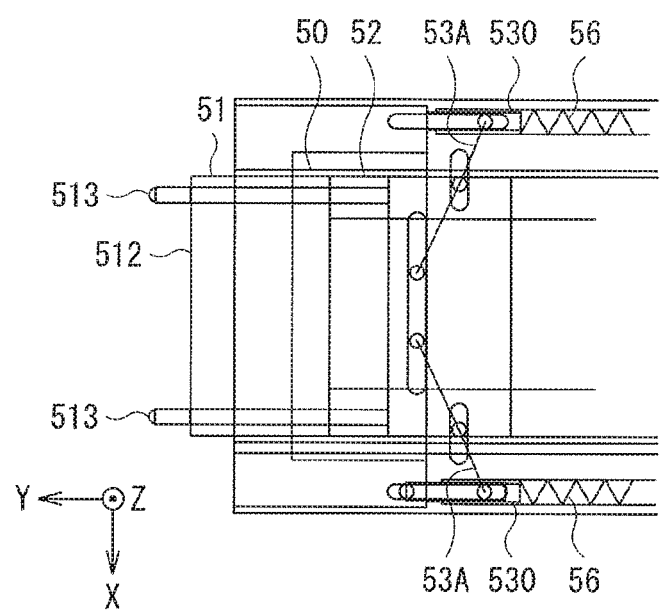
[FIG. 19C]

[ FIG. 20A ]
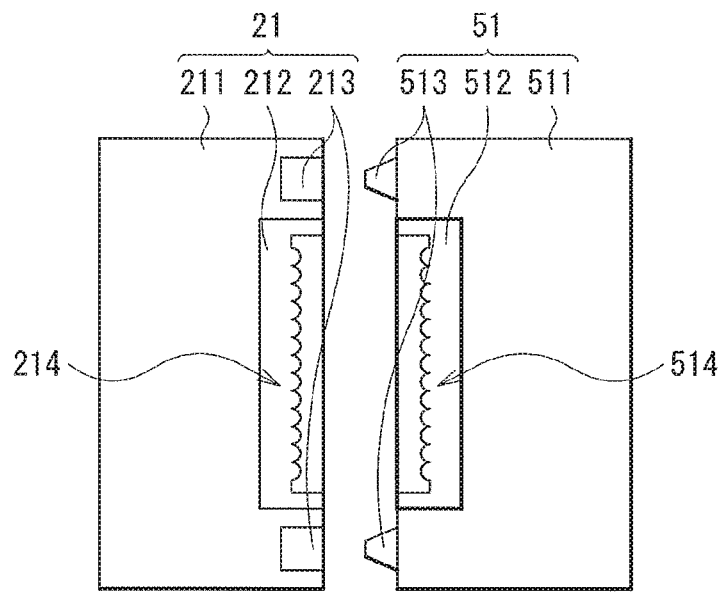
[ FIG. 20B ]
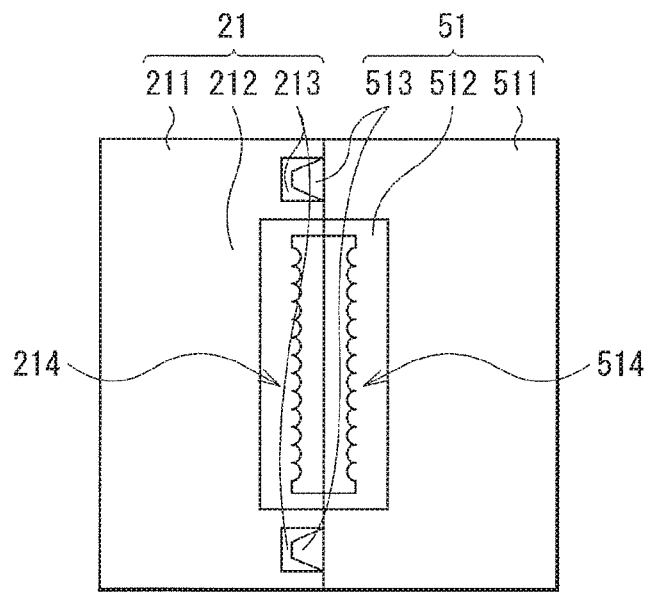

[FIG. 21]
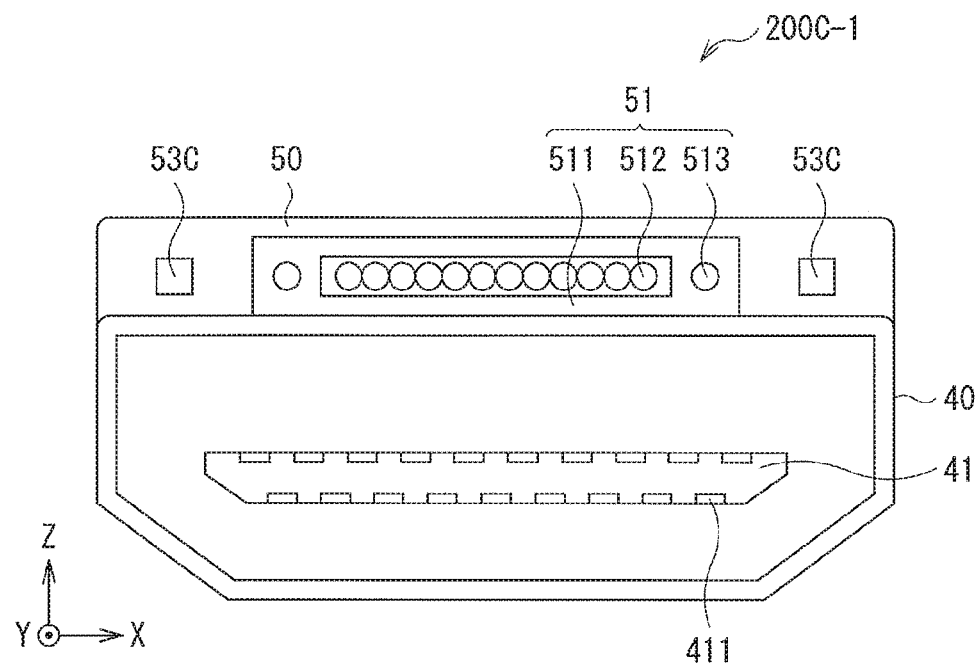

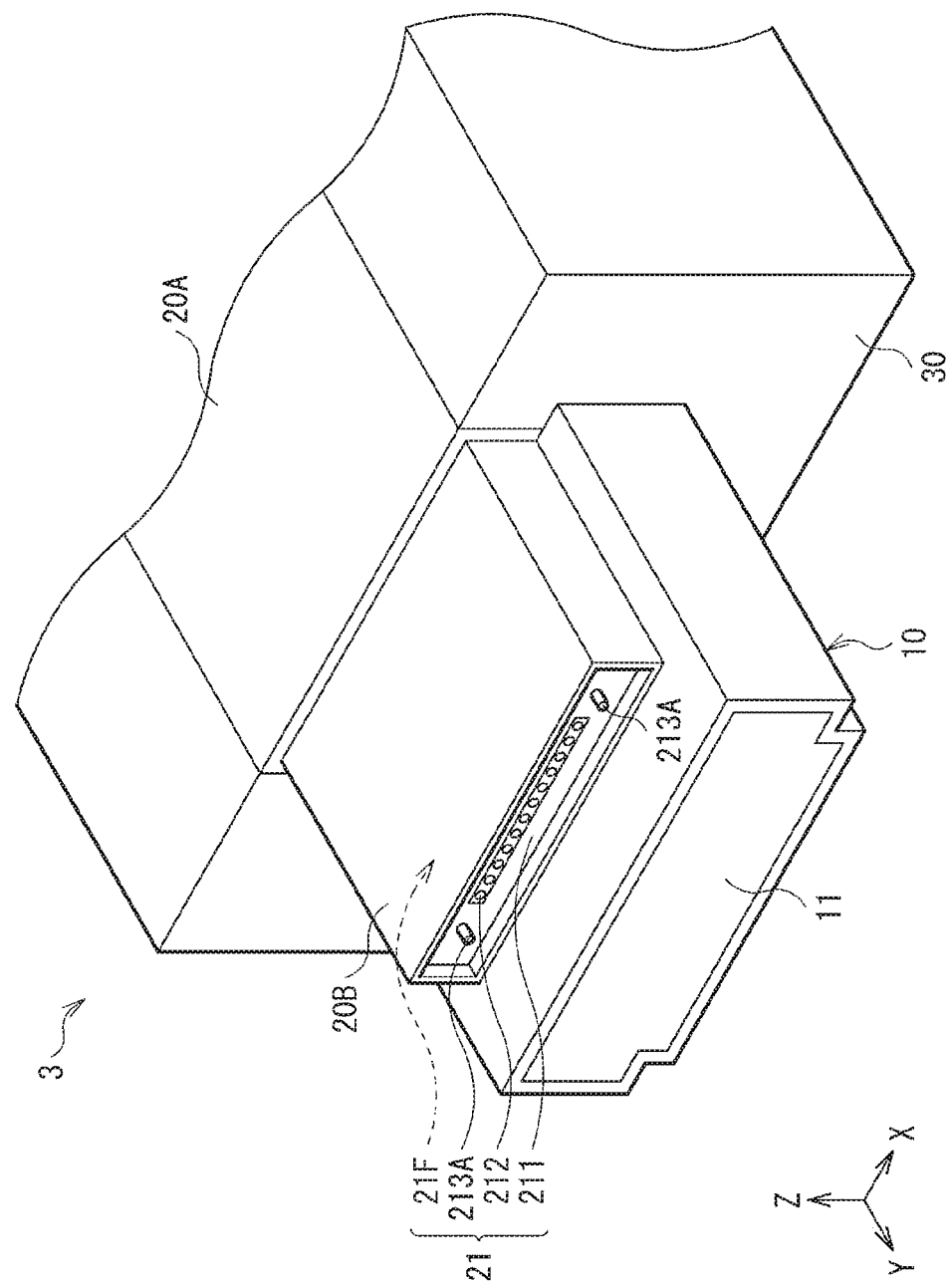
[FIG. 22]

[ FIG. 23 ]
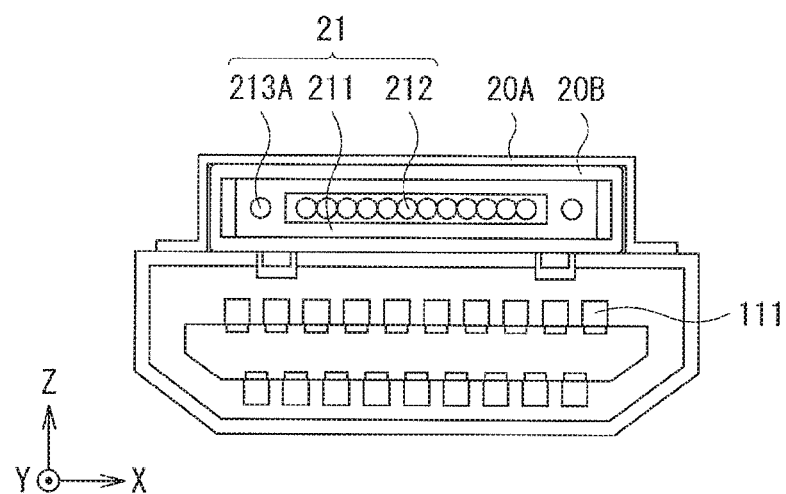
[ FIG. 24 ]
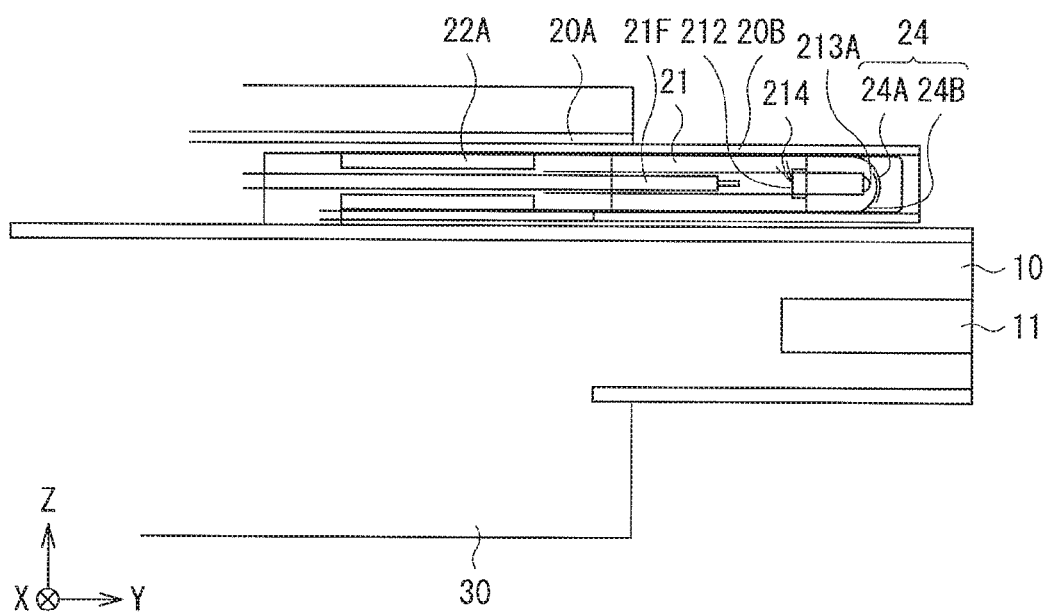

[ FIG. 25 ]
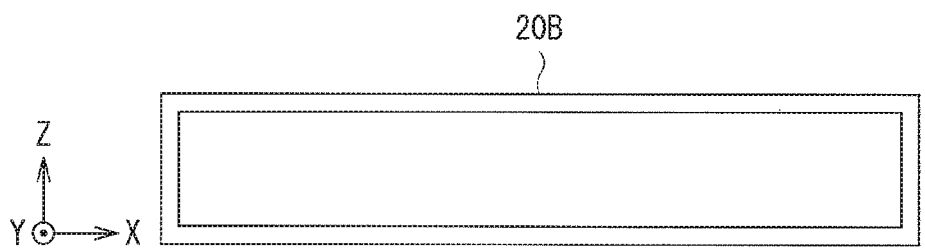
[ FIG.26 ]
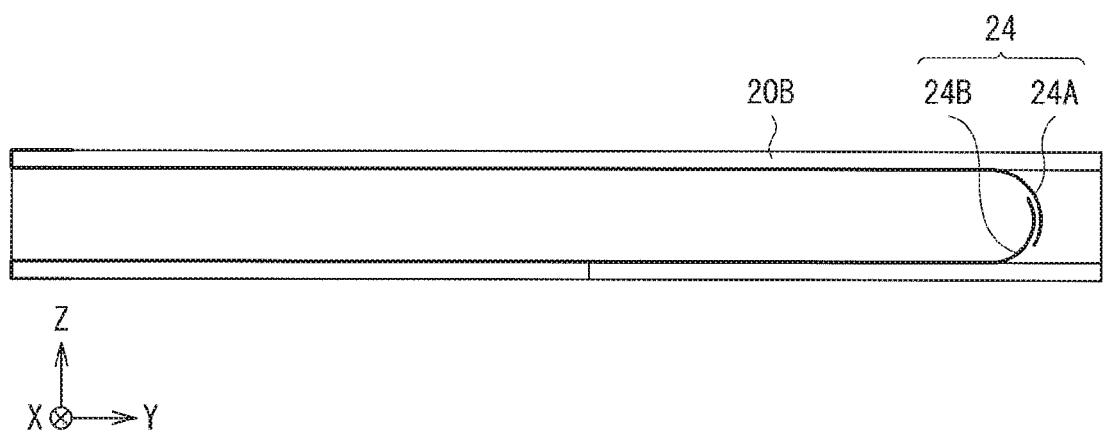
[ FIG. 27 ]
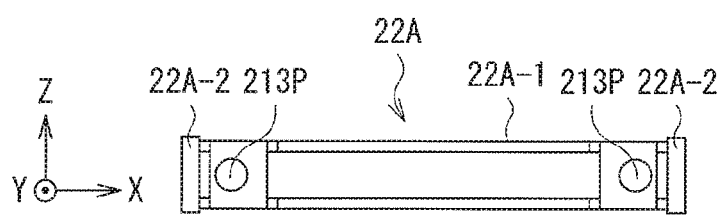

[ FIG. 28A ]
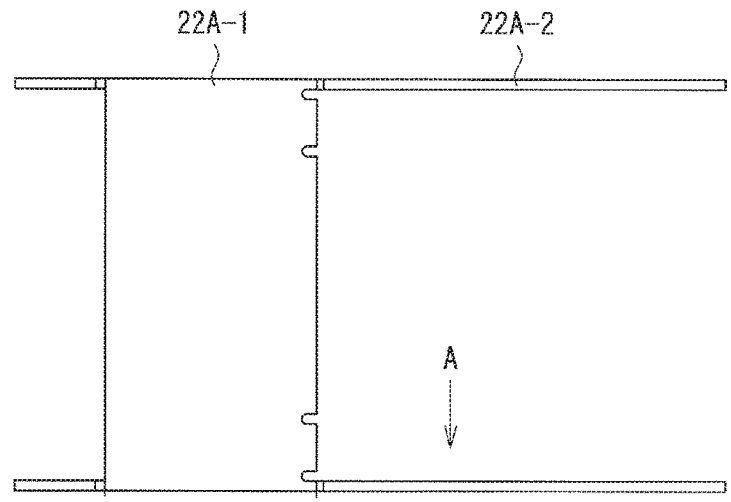
[ FIG. 28B ]
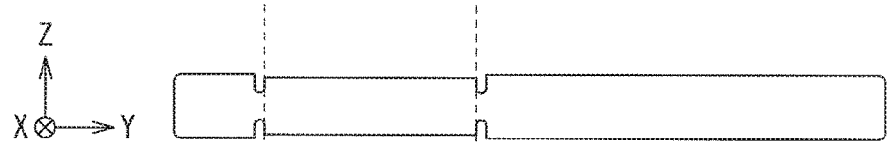
[ FIG. 28C ]
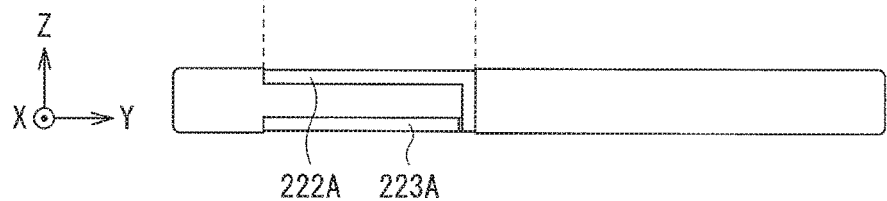

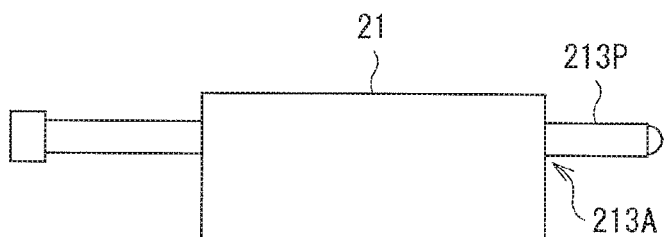
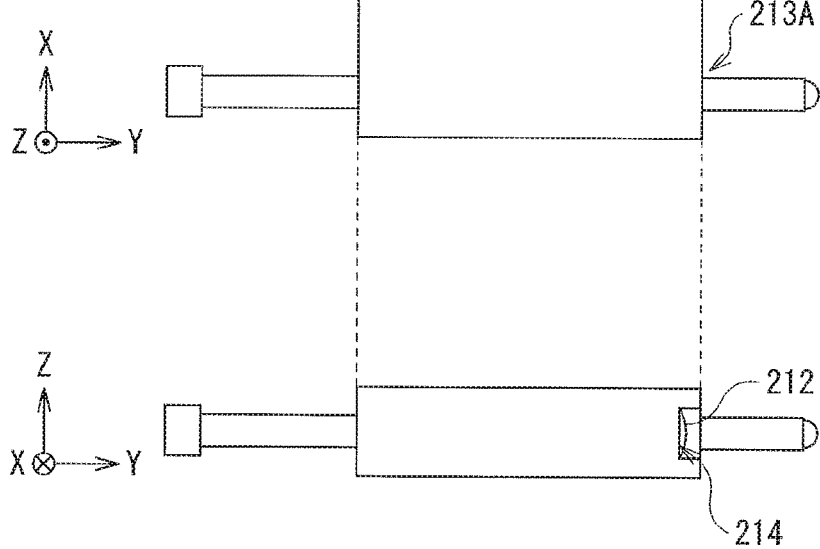
[FIG. 29A]
[FIG. 29B]

[FIG. 30]
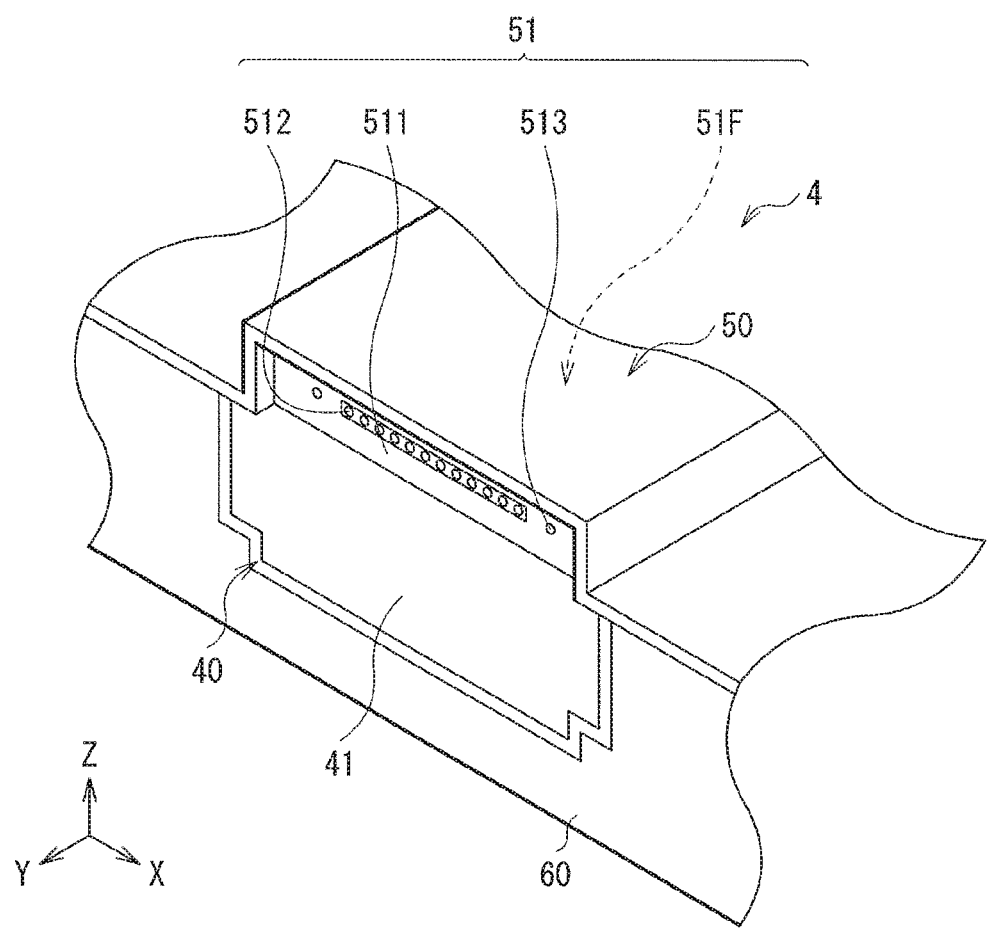

[FIG. 31]
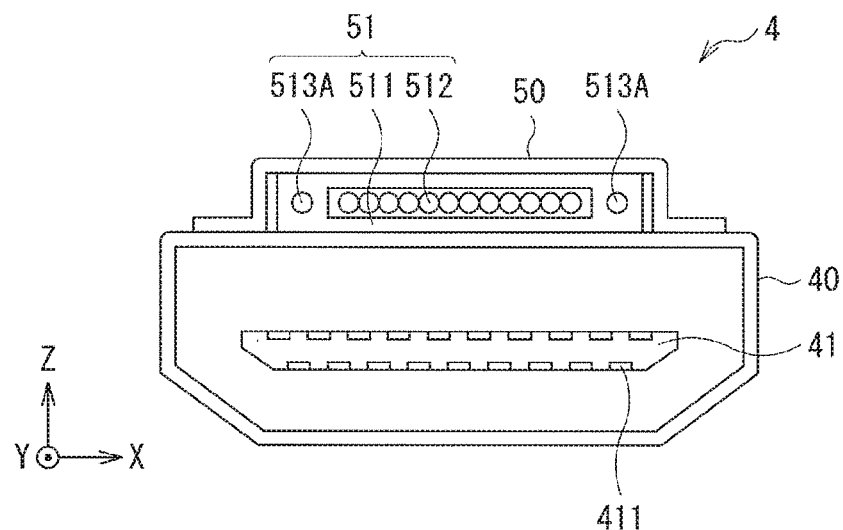
[FIG. 32]
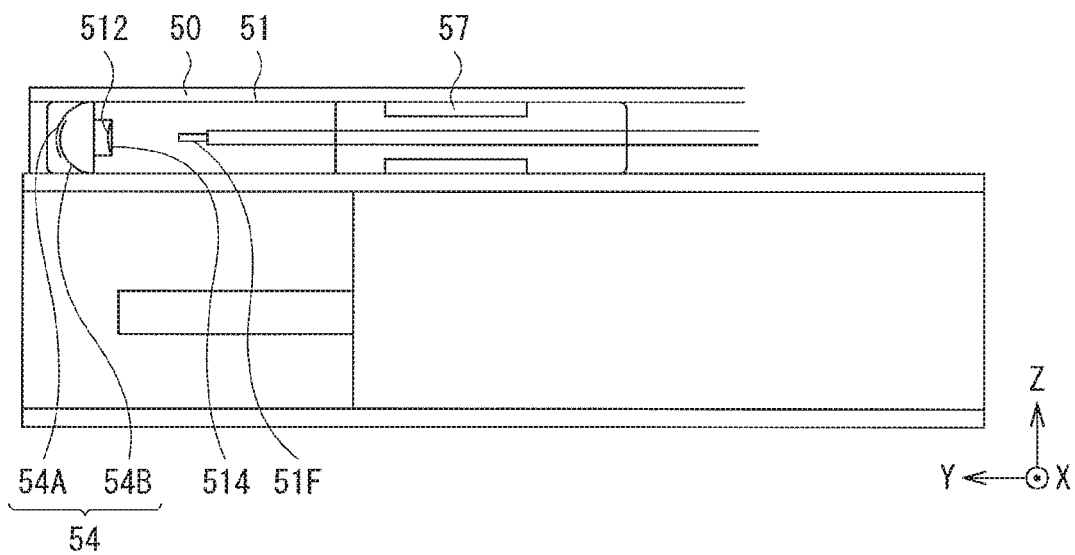
[FIG. 33]
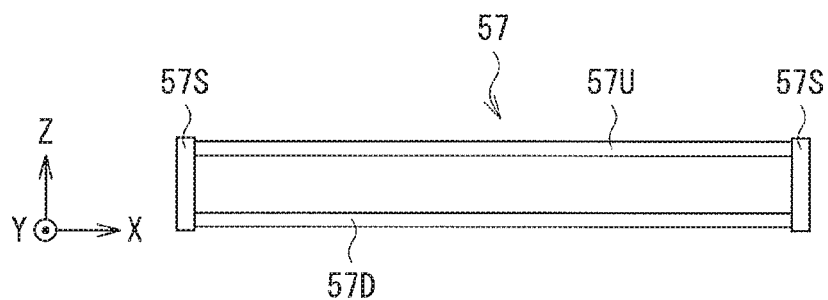

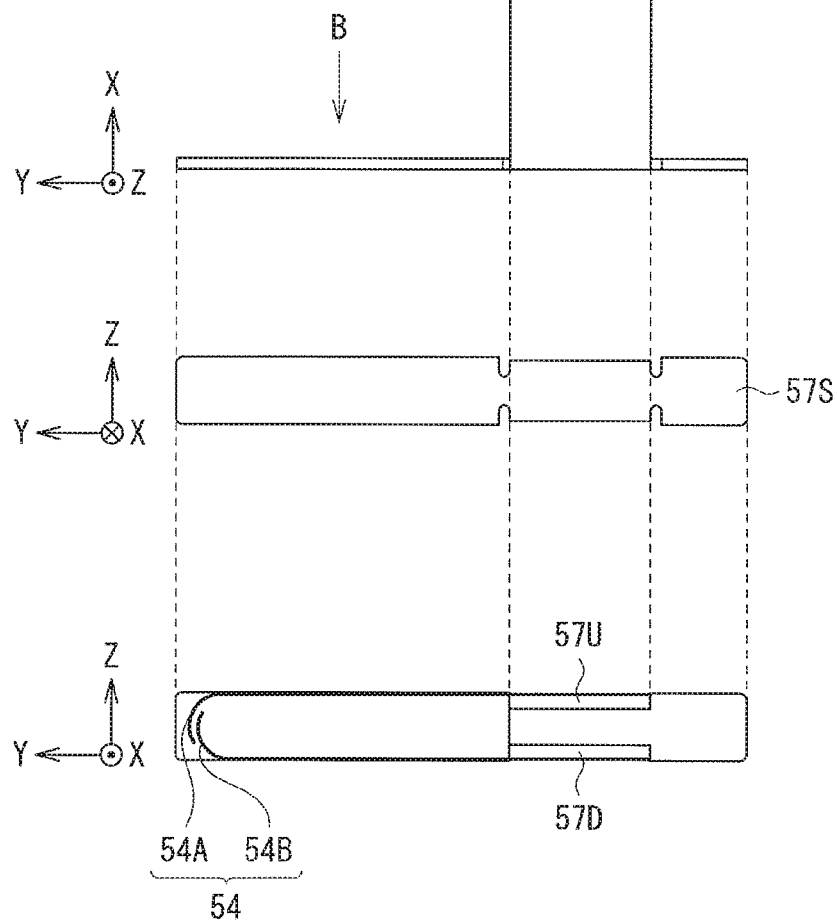

[FIG. 35A]
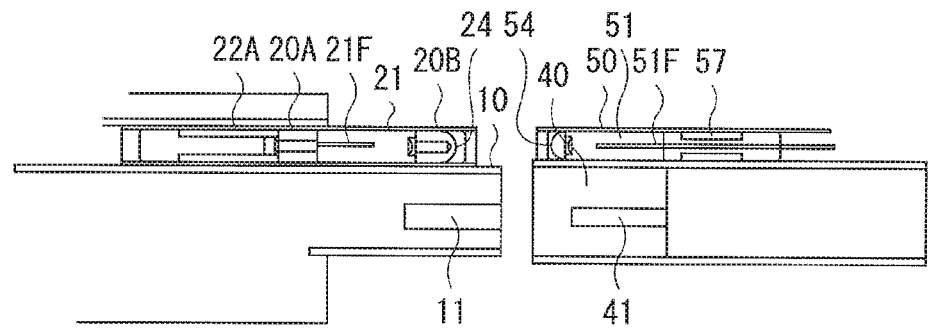
[FIG. 35B]
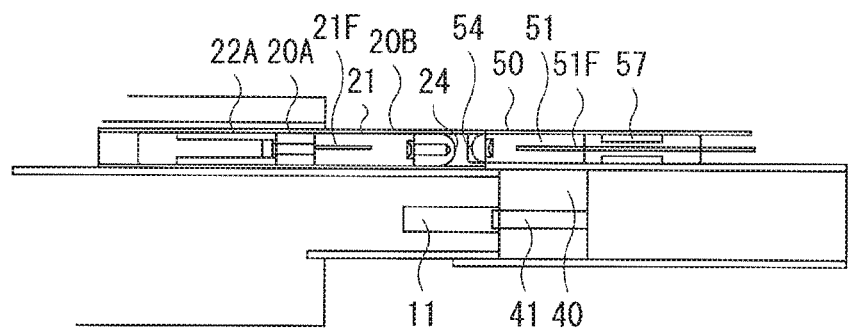
[FIG. 35C]
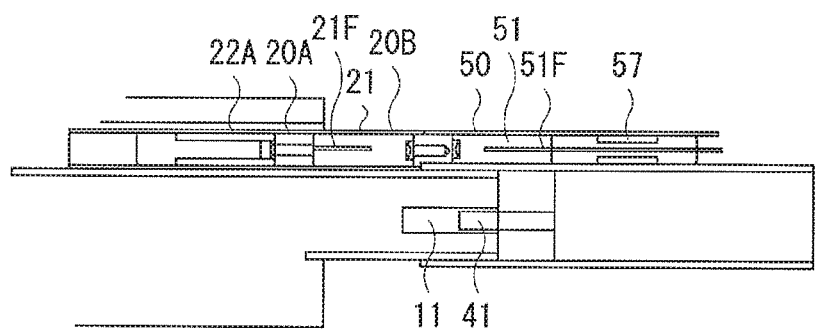
[FIG. 35D]
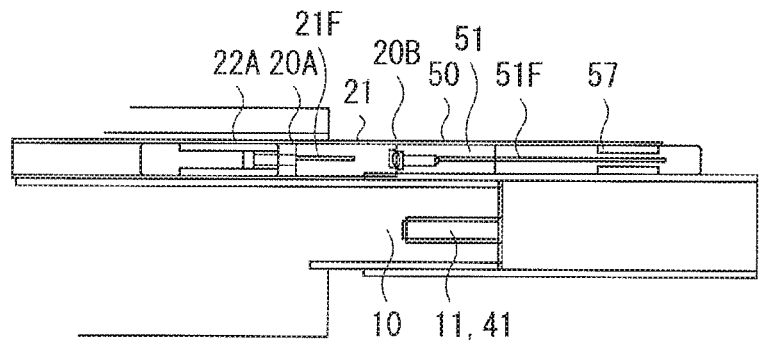

[FIG. 36]
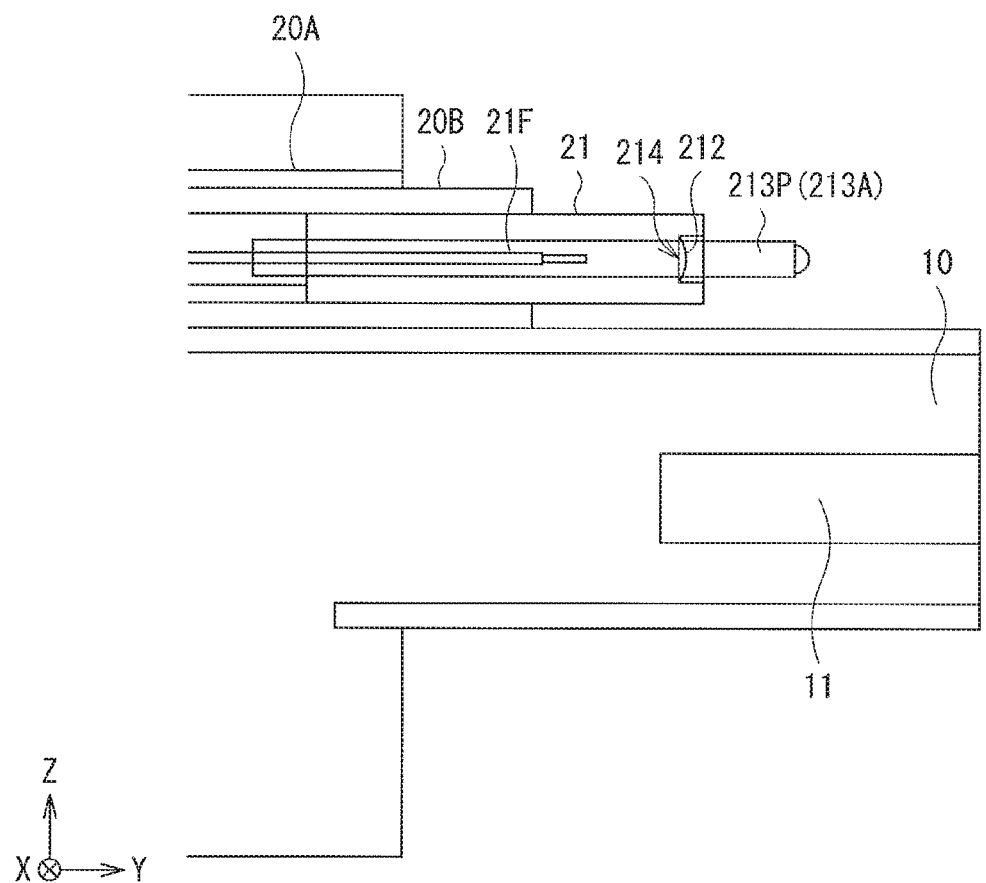

[FIG. 37]
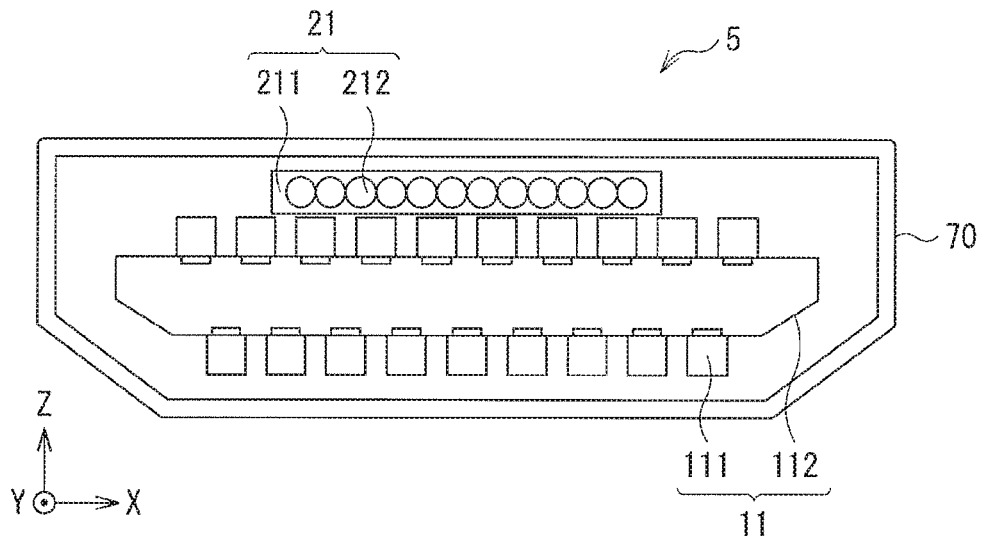
[FIG. 38]
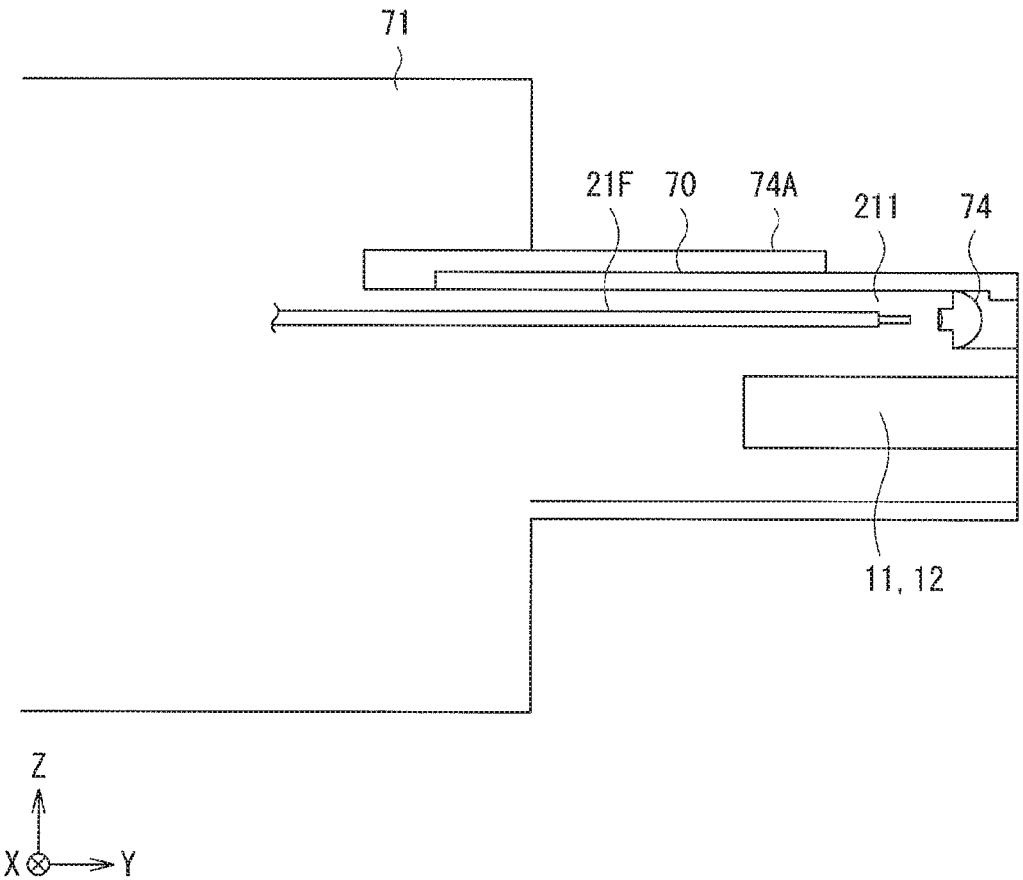

[ FIG. 39A ]
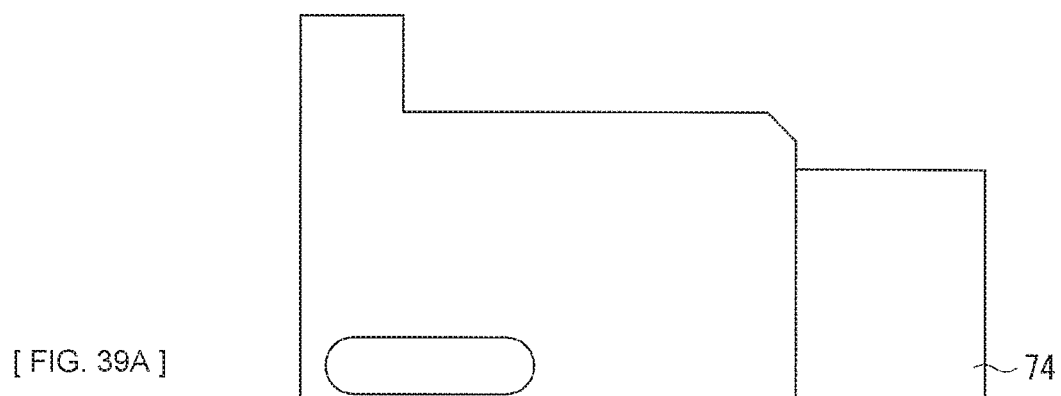
[ FIG. 39B ]
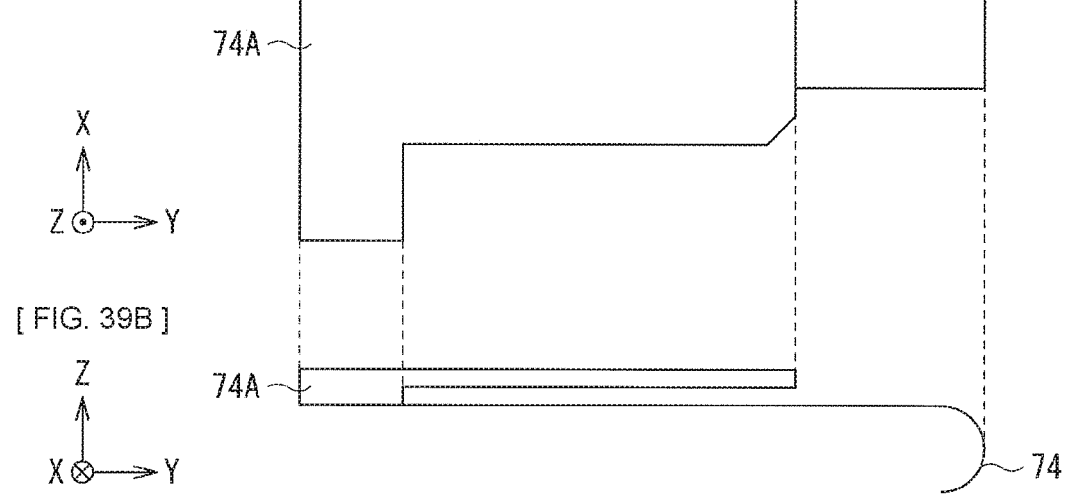
[ FIG. 40 ]
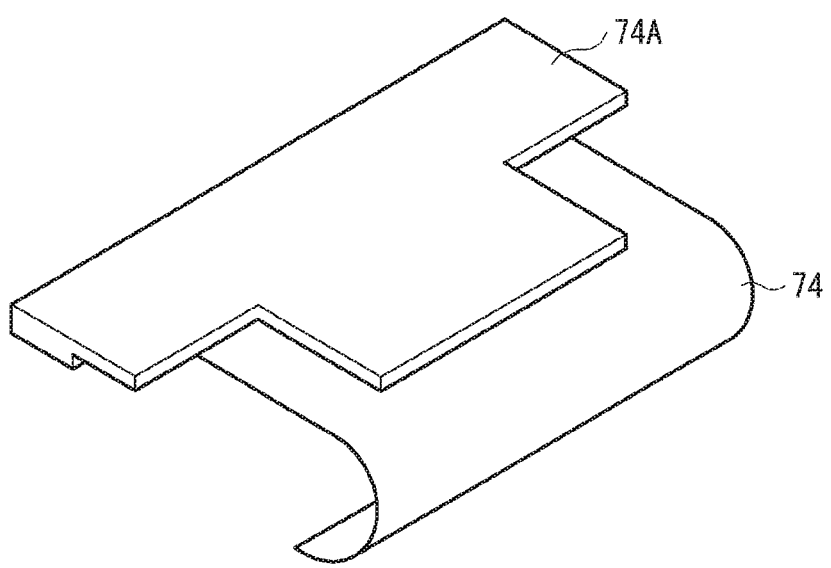

[ FIG. 41 ]
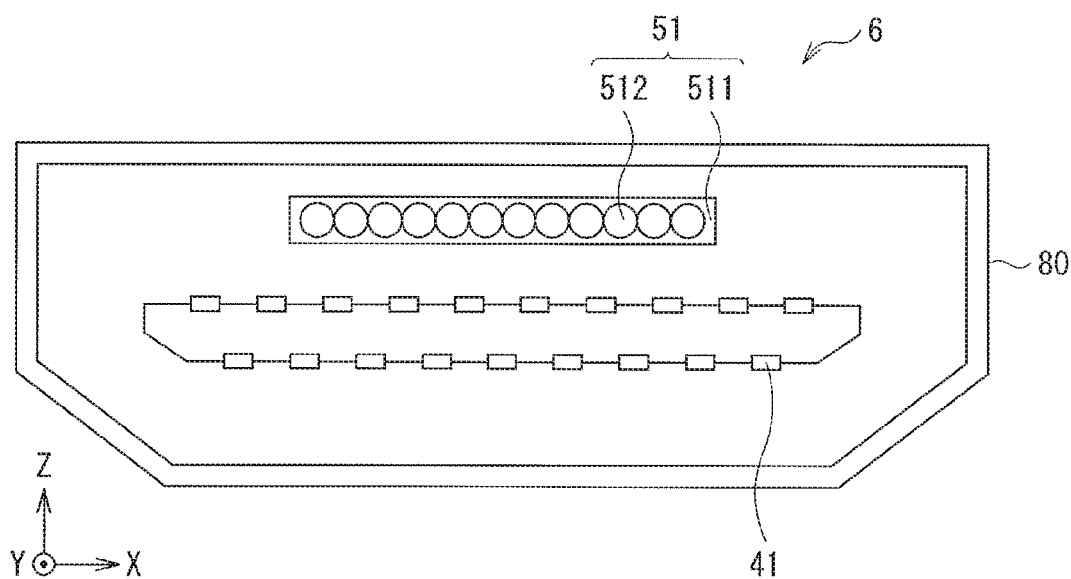
[ FIG. 42 ]
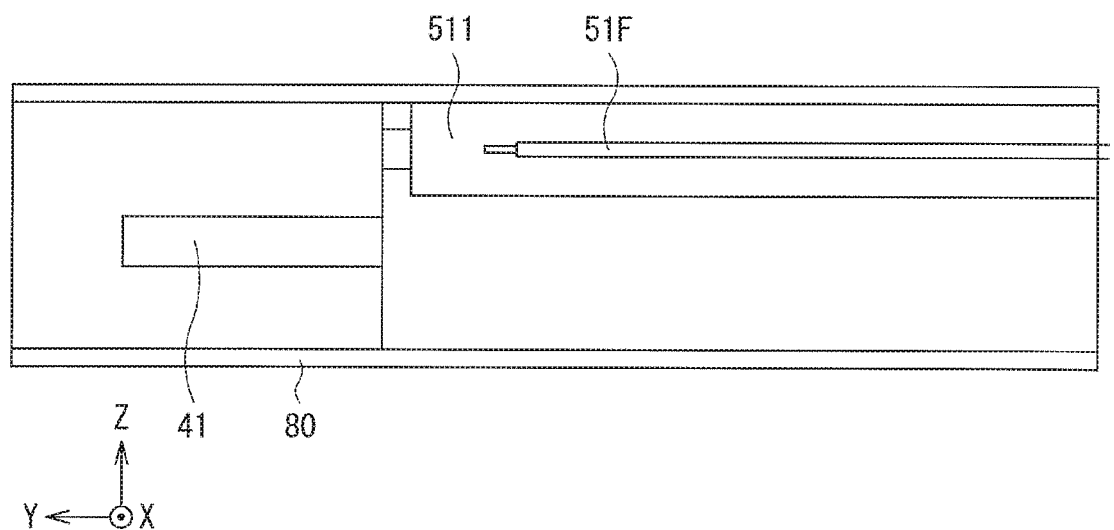

[FIG. 43]
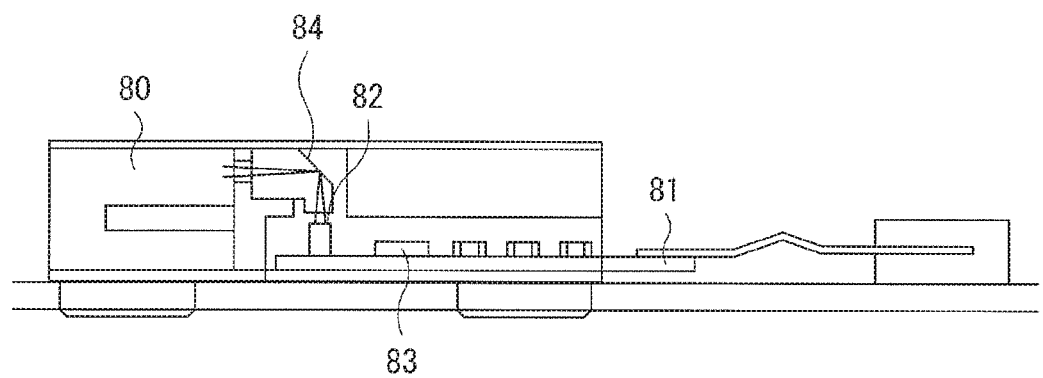
[FIG. 44]
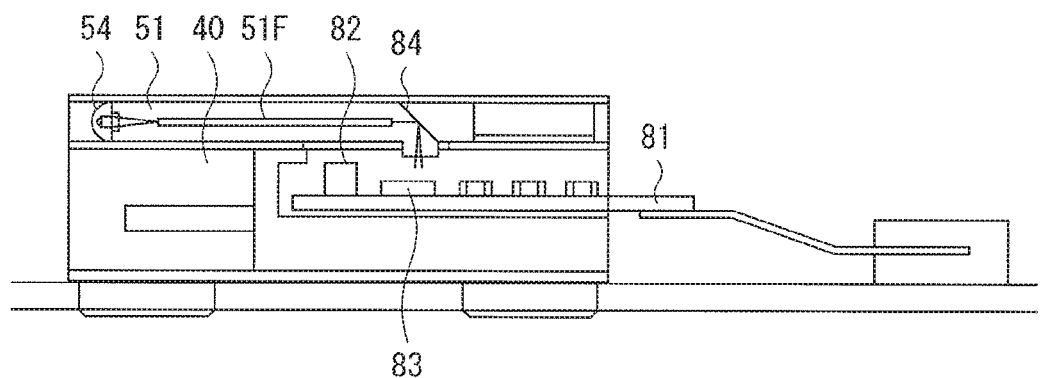
[FIG. 45]
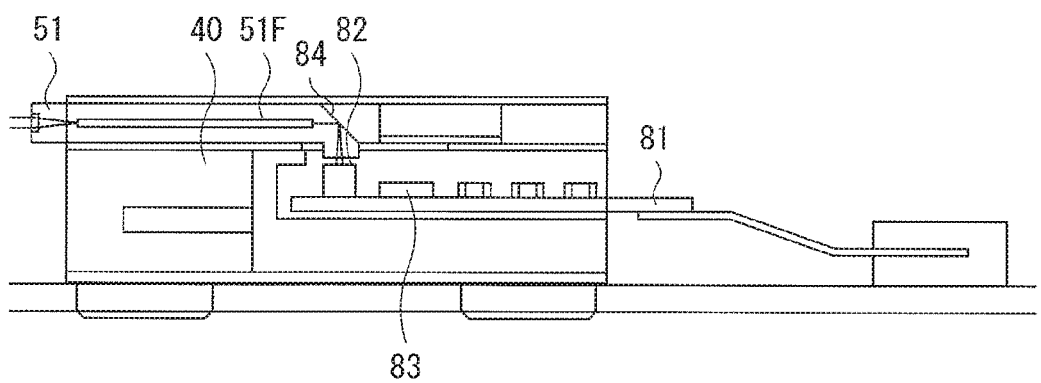

[ FIG. 46 ]
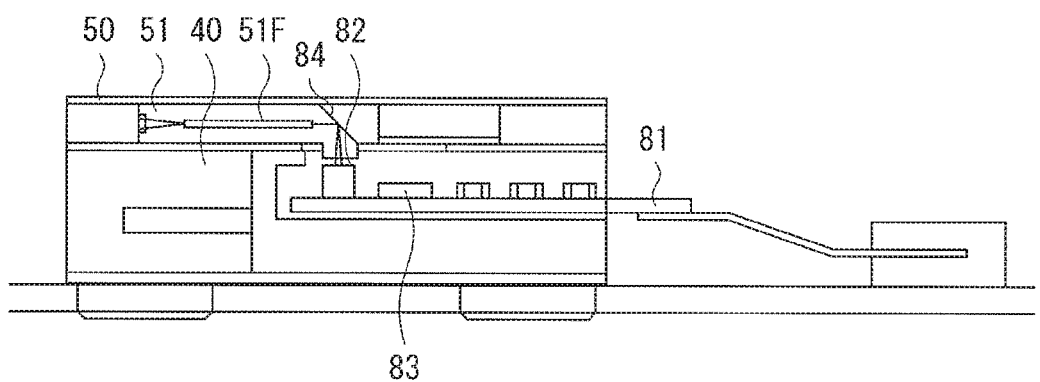
[ FIG. 47 ]
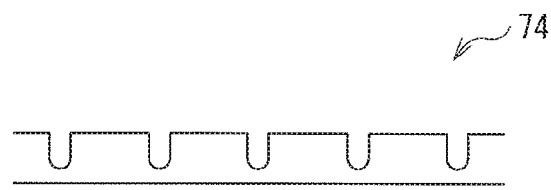

CONNECTOR AND ELECTRONIC APPARATUS

CROSS REFERENCE TO RELATED APPLICATIONS

This application is a U.S. National Phase of International Patent Application No. PCT/JP2017/015660 filed on Apr. 19, 2017, which claims priority benefit of Japanese Patent Application No. JP 2016-109980 filed in the Japan Patent Office on Jun. 1, 2016. Each of the above-referenced applications is hereby incorporated herein by reference in its entirety.

TECHNICAL FIELD

The present technology relates to a connector and an electronic apparatus allowing for optical transmission together with electric transmission.

BACKGROUND ART

For example, interfaces compliant with USB (Universal Serial Bus, registered trademark) and HDMI (High-Definition Multimedia Interface, registered trademark) standards, etc. are currently widespread on the market. Signal transmission between apparatuses has been performed by electric signals with use of such an HDMI (registered trademark)), etc. However, in recent years, a data exchange amount is significantly increased, which causes a demand for an increase in transmission capacity.

Accordingly, technologies to perform optical transmission together with electric transmission have been developed (for example, PTLs 1 and 2).

CITATION LIST

Patent Literature

PTL 1: Japanese Unexamined Patent Application Publication No. 2013-98063
PTL 2: Japanese Unexamined Patent Application Publication No. 2015-153609

SUMMARY OF THE INVENTION

However, in such a hybrid configuration allowing for optical connection together with electric connection, weatherability is easily deteriorated.

It is therefore desirable to provide a connector and an electronic apparatus that have high weatherability.

A connector (1) according to an embodiment of the present technology includes: an electric transmitter; an optical transmitter including a lens at an end of an optical transmission path; a housing that is allowed to contain the optical transmitter; and a slide mechanism that attaches the lens to a connected unit at a position exposed from a front surface of the housing.

A connector (2) according to an embodiment of the present technology includes: an electric transmitter and an optical transmitter; a protective cover that covers a front end surface of the optical transmitter; and a slide mechanism that attaches the optical transmitter to a connected unit at a position exposed from the protective cover.

A connector (3) according to an embodiment of the present technology includes: an optical transmitter including a first resin molded unit; an electric transmitter including a second resin molded unit that includes the same resin material as the first resin molded unit and is integrated with the first resin molded unit; and a housing that contains the electric transmitter and the optical transmitter.

An electronic apparatus (1) according to an embodiment of the present technology includes: a connector unit of a type opposite to a connector to be attached thereto, and the connector unit includes: an electric transmitter; an optical transmitter including a lens at an end of an optical transmission path; a housing that is allowed to contain the optical transmitter; and a slide mechanism that attaches the lens to a connected unit at a position exposed from a front surface of the housing.

An electronic apparatus (2) according to an embodiment of the present technology includes: a connector unit of a type opposite to a connector to be attached thereto, and the connector unit includes: an electric transmitter and an optical transmitter; a protective cover that covers a front end surface of the optical transmitter; and a slide mechanism that attaches the optical transmitter to a connected unit at a position exposed from the protective cover.

An electronic apparatus (3) according to an embodiment of the present technology includes: a connector unit of a type opposite to a connector to be attached thereto, and the connector unit includes: an optical transmitter including a first resin molded unit; an electric transmitter including a second resin molded unit that includes the same resin material as the first resin molded unit and is integrated with the first resin molded unit; and a housing that contains the electric transmitter and the optical transmitter.

In the connectors (1) and (2) and the electronic apparatuses (1) and (2) according to the embodiments of the present technology, the slide mechanism is provided; therefore, the optical transmitter is protected by the housing or the protective cover upon nonattachment, and is exposed from the front surface of the housing upon attachment.

In the connector (3) and the electronic apparatus (3) according to the embodiments of the present technology, the optical transmitter and the electric transmitter are contained in one housing; therefore, surroundings of the optical transmitter are encircled by the electric transmitter and the housing.

According to the connectors (1) and (2) and the electronic apparatuses (1) and (2) of the embodiments of the present technology, the slide mechanism is provided; therefore, the optical transmitter is protected by the housing or the protective cover upon nonattachment. This makes it possible to improve weatherability.

According to the connector (3) and the electronic apparatus (3) of the embodiments of the present technology, the optical transmitter and the electric transmitter are contained in one housing, which makes it possible to support the optical transmitter by the electric transmitter together with the housing. This makes it possible to improve weatherability.

It is to be noted that each of the foregoing connectors (1) to (3) according to the embodiments of the present technology corresponds to at least one of a plug or a receptacle. Moreover, the above contents are examples of the present disclosure. Effects of the present disclosure are not limited to the effects described above, and may be effects other than the effects described above or may further include other effects.

BRIEF DESCRIPTION OF THE DRAWINGS

FIG. 1 is a perspective view of a main-part configuration of a connector according to a first embodiment of the present technology.

FIG. 2 is a front view of a configuration of the connector illustrated in FIG. 1.

FIGS. 3A and 3B are respectively a top view and a side view of the configuration of the connector illustrated in FIG. 1.

FIG. 4 is a perspective view for description of a state in which the connector illustrated in FIG. 1 is attached to an electronic apparatus.

FIGS. 5A and 5B are respectively a top view and a side view of configurations of an optical transmitter and a base member that are illustrated in FIGS. 3A and 3B.

FIG. 6 is a diagram for description of a relationship between the base member and an arm that are illustrated in FIGS. 3A and 3B.

FIGS. 7A and 7B are respectively a top view and a side view of a configuration of a link member illustrated in FIGS. 3A and 3B.

FIG. 8 is a diagram for description of motion of the link member illustrated in FIGS. 7A and 7B.

FIG. 9 is a perspective view of an entire configuration of the electronic apparatus to which the connector illustrated in FIG. 1 is attached.

FIG. 10 is a perspective view of a main-part configuration of a connector unit illustrated in FIG. 9.

FIG. 11 is a front view of a configuration of the connector unit illustrated in FIG. 10.

FIGS. 12A and 12B are respectively a top view and a side view of the configuration of the connector unit illustrated in FIG. 10.

FIGS. 13A and 13B are respectively a top view and a side view of a configuration of an optical transmitter illustrated in FIGS. 12A and 12B.

FIG. 14 is a front view of a configuration of a base member illustrated in FIGS. 12A and 12B.

FIGS. 15A, 15B, and 15C are respectively a top view, a side view, and a bottom view of the configuration of the base member illustrated in FIGS. 12A and 12B.

FIG. 16 is a side view of a configuration of an arm illustrated in FIGS. 12A and 12B.

FIG. 17 is a top view of the configuration of the arm illustrated in FIGS. 12A and 12B.

FIG. 18A is a side view of a state in which the connector illustrated in FIG. 1 is attached to the connector unit illustrated in FIG. 10.

FIG. 18B is a side view of a state following FIG. 18A.
FIG. 18C is a side view of a state following FIG. 18B.
FIG. 18D is a side view of a state following FIG. 18C.

FIG. 19A is a top view of a configuration of the connector unit upon attachment of the connector illustrated in FIG. 1.

FIG. 19B is a top view of a state following FIG. 19A.
FIG. 19C is a top view of a state following FIG. 19B.

FIG. 20A is a diagram for description of a state of lenses before attachment of the connector illustrated in FIG. 1 to the connector unit illustrated in FIG. 10.

FIG. 20B is a diagram illustrating a state following FIG. 20A.

FIG. 21 is a front view of a configuration of a connector unit according to a modification example 1.

FIG. 22 is a perspective view of a main-part configuration of a connector according to a second embodiment of the present technology.

FIG. 23 is a front view of a configuration of the connector illustrated in FIG. 22.

FIG. 24 is a side view of the configuration of the connector illustrated in FIG. 22.

FIG. 25 is a front view of a configuration of a slide-type housing illustrated in FIG. 22.

FIG. 26 is a side view of the configuration of the slide-type housing illustrated in FIG. 22 together with a protective cover.

FIG. 27 is a front view of a configuration of a base member illustrated in FIG. 24.

FIGS. 28A, 28B, and 28C are respectively a top view, one side view, and another side view of the configuration of the base member illustrated in FIG. 24.

FIGS. 29A and 29B are respectively a top view and a side view of a configuration of an optical transmitter illustrated in FIG. 22.

FIG. 30 is a perspective view of a configuration of a connector unit to which the connector illustrated in FIG. 22 is attached.

FIG. 31 is a front view of a configuration of the connector unit illustrated in FIG. 30.

FIG. 32 is a side view of the configuration of the connector unit illustrated in FIG. 30.

FIG. 33 is a front view of a configuration of an interlock member illustrated in FIG. 32.

FIGS. 34A, 34B and 34C are respectively a top view, one side view, and another side view of the configuration of the interlock member illustrated in FIG. 32.

FIG. 35A is a side view of a state in which the connector illustrated in FIG. 22 is attached to the connector unit illustrated in FIG. 30.

FIG. 35B is a side view of a state following FIG. 35A.
FIG. 35C is a side view of a state following FIG. 35B.
FIG. 35D is a side view of a state following FIG. 35C.

FIG. 36 is a side view for description of a state of the connector attached to the connector unit.

FIG. 37 is a front view of a configuration of a connector according to a third embodiment of the present technology.

FIG. 38 is a side view of the configuration of the connector illustrated in FIG. 37.

FIGS. 39A and 39B are respectively a top view and a side view of configurations of a protective cover and an interlock member provided in the connector illustrated in FIG. 37.

FIG. 40 is a perspective view of the configurations of the protective cover and the interlock member that are illustrated in FIGS. 39A and 39B.

FIG. 41 is a front view of a configuration of a connector unit to which the connector illustrated in FIG. 37 is attached.

FIG. 42 is a side view of the configuration of the connector unit illustrated in FIG. 41.

FIG. 43 is a side view of a configuration of a connector unit according to a modification example 2.

FIG. 44 is a side view of another example (1) of the connector unit illustrated in FIG. 43.

FIG. 45 is a side view of a state in which the connector unit illustrated in FIG. 44 is attached to a connector.

FIG. 6 is a side view of another example (2) of the connector unit illustrated in FIG. 43.

FIG. 47 is a cross-sectional view of a protective cover according to a modification example 3.

MODES FOR CARRYING OUT THE INVENTION

In the following, some embodiments of the present technology are described in detail with reference to the drawings. It is to be noted that description is given in the following order.

1. First Embodiment

An example in which a slide mechanism that moves an optical transmitter is provided 2. Modification Example 1

An example in which an optical unit housing has a protrusion

3. Second Embodiment

An example in which a slide mechanism (a slide-type housing) that moves a housing is provided 4. Third Embodiment An example in which an electric transmitter and an optical transmitter are provided in one housing.

5. Modification Example 2

An example in which a wiring board is built in a receptacle

6. Modification Example 3

An example in which a cross-sectional shape of a protective cover includes recesses and protrusions First Embodiment (Configuration of Connector 1)

FIG. 1 illustrates a configuration of a main part of a connector (a connector 1) according to an embodiment of the present technology. FIG. 2, and FIGS. 3A and 3B respectively illustrate configurations of a front surface (in a Y-axis direction), a top surface (in a Z-axis direction), and a side surface (in an X-axis direction) of the entire connector 1. FIGS. 1, 2, 3A, and 3B illustrate a state in which the connector 1 is not attached to a connector unit (a connector unit 200C to be described later in FIG. 10). It is to be noted that in the following description, a direction in which the connector 1 and the connector unit approach each other is referred to as a frontward direction. In the present embodiment, the connector 1 and the connector unit 200C to be described later correspond to specific examples of a "connector (1)" of an embodiment of the present technology.

The connector 1 is, for example, a connector compliant with HDMI (registered trademark) standards. The connector 1 includes an electric unit housing 10, an optical unit housing 20, and a supporting body 30 that supports the electric unit housing 10 and the optical unit housing 20. The electric unit housing 10 is provided to protrude from a front end surface 30F (an XZ plane) of the supporting body 30. The optical unit housing 20 is provided outside the electric unit housing 10. The optical unit housing 20 is disposed above the electric unit housing 10. An electric transmitter 11 is contained inside the electric unit housing 10, and an optical transmitter 21 is contained inside the optical unit housing 20. A base member 22 is provided behind the optical transmitter 21 (FIGS. 3A and 3B), and the optical transmitter 21 and the base member 22 are coupled to each other via two elastic members 25. A link member 23 (a slide mechanism) is provided between a top surface 10U of the electric unit housing 10 and both the optical transmitter 21 and the base member 22. The link member 23 includes a plate-like member 230 and two arms 231. A front end of the plate-like member 230 is disposed at a position protruding from a front end of the optical unit housing 20. The base member 22 and the optical transmitter 21 move in a frontward-rearward direction (a Y direction) in conjunction with motion of the link member 23 by the two arms 231. A front end surface of the optical transmitter 21 is covered with a protective cover 24. The connector 1 is a so-called male connector and a plug. The connector 1 is attached to, for example, a female connector and an electronic apparatus (for example, an electronic apparatus 2 to be described later in FIG. 9) including a receptacle, thereby allowing electric transmission and optical transmission to be performed. It is to be noted that for convenience of description, the protective cover 24 is not illustrated in FIGS. 1 and 2.

The electric unit housing 10 includes, for example, metal such as stainless steel, and has an opening 10K on a front surface thereof. The opening 10K has, for example, a substantially trapezoidal shape, and the female connector is fit into the opening 10K.

The electric transmitter 11 provided inside the electric unit housing 10 includes a plurality of electrodes 111 extending in an extending direction (a Y-axis direction) of the electric unit housing 10 on an insulating substrate including, for example, polyimide, etc. Arrangement of the electrodes 111 is compliant with the HDMI (registered trademark) standards, for example.

The optical unit housing 20 is disposed at a position behind the electric unit housing 10, and is provided so as to be embedded in the supporting body 30. The optical unit housing 20 is provided so as to encircle a top surface and side surfaces of the optical transmitter 21. In other words, the optical unit housing 20 is provided around the optical transmitter 21 in a U-letter like shape. A bottom surface of the optical transmitter 21 is supported by the top surface 10U of the electric unit housing 10. A front surface of the optical unit housing 20 has an opening 20K. The optical transmitter 21 is exposed from the opening 20K, which allows the connector 1 to be attached to the female connector.

The optical transmitter 21 includes a supporting unit 211, a plurality of lenses 212, a position regulating unit 213, and an optical transmission body 21F. The supporting unit 211 has a substantially rectangular parallelepiped shape. The lenses 212 and the position regulating unit 213 are provided on a front end surface of the supporting unit 211, and the optical transmission body 21F extends from behind the respective lenses 212 along a frontward-rearward direction (the Y direction) of the supporting unit 211. In other words, in the connector 1, an optical transmission path is provided along a frontward-rearward direction of the optical transmitter 21, and the lenses 212 are provided at an end of the optical transmission path.

The optical transmitter 21 is movable along the frontward-rearward direction through being connected to the link member 23 via the base member 22. Upon nonattachment to the female connector, the front end surface of the optical transmitter 21 is disposed behind the front surface (the opening 20K) of the optical unit housing 20, and the optical transmitter 21 is contained in the optical unit housing 20.

FIG. 4 illustrates a position of the optical transmitter 21 upon attachment to the electronic apparatus. Upon attachment to the female connector, a front end section of the optical transmitter 21 including the lenses 212 and the position regulating unit 213 is exposed from the front surface (the opening 20K) of the optical unit housing 20 in the frontward direction (a direction approaching the female connector, a first direction). As will be described in detail later, the optical transmitter 21 is movable in the frontward-rearward direction in such a manner; therefore, the optical transmitter 21 is protected by the optical unit housing 20 upon nonattachment to the female connector.

FIGS. 5A and 5B illustrate a configuration of the optical transmitter 21 together with a configuration of the base member 22. FIG. 5A illustrates configurations of top surfaces of the optical transmitter 21 and the base member 22, and FIG. 5B illustrates configurations of side surfaces thereof. The optical transmitter 21, more specifically, the supporting unit 211 of the optical transmitter 21 is coupled, by the elastic members 25, to the base member 22 located behind the optical transmitter 21. The elastic members 25 each include, for example, a spring. An impact to the optical transmitter 21 by physical stimulation is thereby relieved. Moreover, even in a case where a mutual positional relationship between the optical transmitter 21 and an optical transmitter (an optical transmitter 51 to be described later in FIG. 10) of the female connector is deviated due to variations in manufacturing, etc., it is possible to reliably fit the optical transmitter 21 and the optical transmitter of the female connector into each other by a pressure applied by the elastic member 25.

The supporting unit 211 of the optical transmitter 21 includes, for example, a resin for injection molding. As described above, upon nonattachment to the electronic apparatus, the front end surface of the supporting unit 211 is disposed behind the front end surface (the opening 20K) of the optical unit housing 20 (FIGS. 3A and 3B). A recess 214 is provided in a central portion of the front end surface of the supporting unit 211, and the lenses 212 are provided in the recess 214. The recess 214 is recessed from the front end surface of the supporting unit 211 by about 50 µm to about 500 µm, for example.

The lenses 212 each are a collimate lens, and convert light outputted from the optical transmission body into parallel light or concentrate incident light (parallel light) from the electronic apparatus onto an end section of the optical transmission body. The plurality of lenses 212 are arranged along the front end surface of the supporting unit 211 (along the X-axis direction) with a pitch of 250 µm, for example. Upon attachment to the electronic apparatus, each of the plurality of lenses 212 faces a lens (a lens 512 in FIG. 10) on a side on which the electronic apparatus is located. The optical transmission body 21F is provided corresponding to a focal point of the lens 212, and is optically coupled to the lens 212. The optical transmission body 21F causes incident light from the lens 212 to propagate, or outputs propagated light, via the lens 212, to the lens on the side on which the electronic apparatus is located. The optical transmission body 21F is, for example, an optical fiber, etc., and includes quartz, a glass material, a fluorine-based polymer, an acrylic-based polymer, etc.

The position regulating unit 213 performs alignment upon attachment to the electronic apparatus, and two position regulating units 213 are provided on both ends of the front end surface of the supporting unit 211. Each of the position regulating units 213 is fit into a position regulating unit (a position regulating unit 513 in FIG. 10) provided in an optical transmitter of the female connector to fix the optical transmitter 21 to a precise position. For example, each of the position regulating units 213 is a circular recess provided in the front end surface of the supporting unit 211, and the position regulating unit of the female connector is a protrusion fit in the recess. The position regulating units 213 may include a protrusion and the position regulating unit of the female connector may include a recess.

The base member 22 has a substantially rectangular shape in plan (XY plane) view, and moves in conjunction with the link member 23. The base member 22 is provided with an elliptical hole 221 extending in a horizontal direction (an X direction). The hole 221 is provided, for example, in a front portion of the base member 22, that is, at a position close to the optical transmitter 21. The base member 22 includes, for example, a stainless steel plate, and includes an L-letter like upper member 222 and a plate-like lower member 223. The upper member 222 is bent rearward from a top surface thereof. The lower member 223 is disposed to face the top surface of the upper member 222.

FIG. 6 illustrates a relationship between the base member 22 and the link member 23. For example, two stick-like hooking members 224 are provided in the hole 221 of the base member 22. A point of effort 231A, a fulcrum 231B, and a point of load 231C are present in each of the two arms 231 of the link member 23, and the point of load 231C acts on the hooking member 224 to move the base member 22 along the frontward-rearward direction.

FIGS. 7A and 7B illustrate a configuration of the link member 23. FIG. 7A illustrates a configuration of a top surface of the link member 23, and of FIG. 7B illustrates a configuration of a side surface of the link member 23. The link member 23 includes the plate-like member 230 and two arms 231, as described above. Two elastic members 26 are connected to a rear end of the plate-like member 230, and the link member 23 is movable along the frontward-rearward direction. The elastic members 26 each include, for example, a spring. The plate-like member 230 includes a substantially rectangular front section 230F and a rear section 230R that is wider than the front section 230F. A front end of the front section 230F has a shape in which two edges are removed. The plate-like member 230 has an axisymmetric shape, and the two arms 231 are disposed at positions symmetric with respect to a symmetry axis of the plate-like member 230. Two elliptical holes 232 extending in the frontward-rearward direction are provided from the front section 230F to the rear section 230R of the plate-like member 230. The two holes 232 are disposed at positions symmetric to each other with respect to the symmetry axis of the plate-like member 230. The fulcrum 231B of the arm 231 is disposed in the hole 232. The arms 231 each have the point of effort 231A, the fulcrum 231B, and the point of load 231C in order from outside. The point of load 231C of each of the arms 231 is disposed behind the rear end of the plate-like member 230 (the rear section 230R) upon nonattachment to the female connector (FIGS. 7A and 7B). In other words, the point of effort 231A, the fulcrum 231B, and the point of load 231C are disposed in this order from the front.

FIG. 8 illustrates a state of the link member 23 upon attachment to the female connector. Upon attachment to the electronic apparatus, a front end section of the plate-like member 230 (the front section 230F) is pressed against the female connector, thereby causing the fulcrum 231B to move in the hole 232 and causing the point of load 231C to act on the hooking member 224. Accordingly, the optical transmitter 21 moves frontward together with the base member 22. Upon attachment to the female connector, the fulcrum 231B moves frontward in the hole 232, and in the arm 231, the point of load 231C, the fulcrum 231B, and the point of effort 231A are disposed in this order from the front.

The protective cover 24 protects the optical transmitter 21 from contamination and breakage upon nonattachment to the female connector, and as a material of the protective cover 24, for example, a stainless steel plate is usable. The protective cover 24 includes an upper section 24A provided from the top surface to the front end surface of the optical transmitter 21 and a lower section 24B provided from the bottom surface to the front end surface of the optical transmitter 21. A portion of the upper section 24A and a portion of the lower section 24B overlap each other on the front end surface of the optical transmitter 21. The protective cover 24 is formed in an arc shape in side view on the front end surface of the optical transmitter 21, and is not in contact with the front end surface of the optical transmitter 21. The protective cover 24 has a roll shape wound around the front end surface of the optical transmitter 21. The protective cover 24 is fixed to the optical unit housing 20, and upon attachment to the female connector, the front end surface of the optical transmitter 21 moves forward of the protective cover 24. The protective cover 24 may be provided from the top surface to the front end surface of the optical transmitter 21, and may be configured to open upward. Alternatively, the protective cover 24 may be provided from the bottom surface to the front end surface of the optical transmitter 21, and may be configured to open downward. In other words, the protective cover 24 may be configured to open only one of upward and downward.

(Configuration of Connector Unit 200C)

FIG. 9 illustrates an external appearance of the electronic apparatus 2 to which the connector 1 is attached. The electronic apparatus 2 is a notebook personal computer, and includes, for example, a main body 200, a keyboard 200K for input operation of letters, etc., and a display unit 200D that displays an image. A connector unit 200C (a female connector) of a type opposite to the connector 1 is provided in the main body 200. The electronic apparatus 2 allows the connector 1 having an optical transmission function to be attached thereto, and allows a connector having only an existing electric transmission function to be attached thereto. The connector unit 200C has a configuration substantially similar to the connector 1, except that an electric unit housing (an electric unit housing 40 to be described later in FIG. 10) has a recessed shape that is allowed to contain the electric unit housing 10 (the electric transmitter 11) of the connector 1.

FIG. 10 illustrates a configuration of the connector unit 200C. FIG. 11, FIG. 12A, and FIG. 12B respectively illustrate configurations of a front surface, a top surface, and a side surface of the connector unit 200C. FIGS. 11, 12A, and 12B illustrate a state in which the connector unit 200C is not attached to the connector 1. As described above, the connector unit 200C has a configuration substantially similar to the connector 1, and an electric transmitter 41 and the optical transmitter 51 are respectively contained in the electric unit housing 40 and an optical unit housing 50.

The electric unit housing 40 and the optical unit housing 50 are supported by a supporting body 60.

A base member 52 is provided behind the optical transmitter 51, and the optical transmitter 51 and the base member 52 are coupled to each other via elastic members (elastic members 55 to be described later in FIGS. 15A, 15B, and 15C). The connector unit 200C includes a link member 53 in place of the link member 23 of the connector 1. The link member 53 includes moving members 530 and arms 53A. Two moving members 530 and two arms 53A are provided in the link member 53. Front end sections (protrusions 53C) of the moving members 530 are provided on a front end surface of the electric unit housing 40, and in a case where the connector 1 is pressed against the protrusions 53C, the base member 52 and the optical transmitter 51 move in conjunction with motion of the moving members 530 and the arms 53A. In (A) of FIG. 12A, the arms 53A in a case where the base member 52 and the optical transmitter 51 are located on a rear side is represented by a solid line, and the arms 53A in a case where the base member 52 and the optical transmitter 51 are located on a front side is represented by a broken line. The front end surface of the optical transmitter 51 is covered with a protective cover 54. It is to be noted that for convenience of description, the protective cover 54 is not illustrated in FIGS. 10 and 11.

The optical transmitter 51 includes a supporting unit 511, a plurality of lenses 512, a position regulating unit 513, and an optical transmission body 51F. The optical transmitter 51 is movable along the frontward-rearward direction through being connected to the link member 53 via the base member 52. A front surface of the optical unit housing 50 is an opening 50K. Upon nonattachment to the connector 1, the front end surface of the optical transmitter 51 is disposed behind the front surface (the opening 50K) of the optical unit housing 50, and the optical transmitter 51 is contained in the optical unit housing 50. Upon attachment to the connector 1, the lenses 512 are exposed from the front surface (the opening 50K) of the optical unit housing 50 in the frontward direction (a direction approaching the male connector). As will be described in detail later, the optical transmitter 51 is movable in the frontward-rearward direction in such a manner; therefore, the optical transmitter 51 is protected by the optical unit housing 50 upon nonattachment to the connector 1.

FIGS. 13A and 13B illustrate a configuration of the optical transmitter 51. FIGS. 13A and 13B respectively illustrate configurations of a top surface and a side surface of the optical transmitter 51. A recess 514 is provided in a central portion of the front end surface of the supporting unit 511, and the lenses 512 are provided in the recess 514. The position regulating unit 513 has a shape fit into the position regulating unit 213 of the connector 1. The position regulating unit 513 is formed, for example, through protruding an end section of a linearly extending pin 513P from the front end surface of the optical transmitter 51. The pin 513P is supported by the base member 52. Accordingly, as compared with a case where the pin 513P is supported by the optical transmitter 51, a longer length of the position regulating unit 513 (the pin 513P protruding from the front end surface of the optical transmitter 51) is maintained by a shorter stroke (travel distance) of the optical transmitter 51.

FIGS. 14, 15A, 15B, and 15C illustrate a configuration of the base member 52 together with the pin 513P. FIG. 14, FIG. 15A, FIG. 15B, and FIG. 15C respectively illustrate configurations of a front surface, a top surface, a side surface, and a bottom surface of the base member 52. The optical transmitter 51, more specifically, the supporting unit 511 of the optical transmitter 51 is coupled to the base member located behind the optical transmitter 51 by the elastic members 55. An impact to the optical transmitter 51 by physical stimulation is thereby relieved. Moreover, even in a case where a mutual positional relationship between the optical transmitter 21 and the optical transmitter 51 of the female connector is deviated due to variations in manufacturing, etc., it is possible to reliably fit the optical transmitter 21 and the optical transmitter 51 of the female connector into each other by a pressure applied by the elastic members 55. The elastic members 55 each include, for example, a spring.

The base member 52 has a substantially rectangular shape in plan (XY plane) view, and moves in conjunction with the link member 53. The base member 52 is provided with an elliptical hole 521 extending in the horizontal direction (the X direction). For example, two stick-like hooking members penetrate through the hole 521 (not illustrated).

FIGS. 16 and 17 illustrate configurations of the moving members 530 and the arms 53A. FIG. 16 illustrates configurations of side surfaces of the moving members 530 and the arms 53A, and FIG. 17 illustrates configurations of top surfaces of the moving members 530 and the arms 53A. The moving members 530 each have, for example, a rectangular shape in plan view. Front ends of the moving members 530 each configure the protrusion 53C, and elastic members 56 are coupled to rear ends of the moving members 530. The electric unit housing 40 has, for example, an axisymmetric shape in top view, and the two arms 53A are disposed at positions symmetric to each other with respect to a symmetry axis of the electric unit housing 40. In each of the arms 53A, for example, a point of effort 53A-A, a fulcrum 53A-B, and a point of load 53A-C are disposed in order from outside, and the point of effort 53A-A is coupled to the moving member 530. The arms 53A each are rotatable around the fulcrum 53A-B as a center (FIG. 12A).

The protective cover 54 (FIG. 12B) protects the optical transmitter 51 from contamination and breakage upon non-attachment to the connector 1. The protective cover 54 includes an upper section 54A provided from the top surface to the front end surface of the optical transmitter 51 and a lower section 54B provided from the bottom surface to the front end surface of the optical transmitter 51. A portion of the upper section 54A and a portion of the lower section 54B overlap each other on the front end surface of the optical transmitter 51. The protective cover 54 is formed in an arc shape in side view on the front end surface of the optical transmitter 51, and is not in contact with the front end surface of the optical transmitter 51. The protective cover 54 has a roll shape. The protective cover 54 is fixed to the optical unit housing 50, and upon attachment to the connector 1, the front end surface of the optical transmitter 51 moves forward of the protective cover 54. As with the protective cover 24, the protective cover 54 may be provided from the top surface to the front end surface of the optical transmitter 51, and may be configured to open upward. Alternatively, the protective cover 54 may be provided from the bottom surface to the front end surface of the optical transmitter 51, and may be configured to open downward. In other words, the protective cover 54 may be configured to open only one of upward and downward.

(Attachment of Connector 1 to Connector Unit 200C)

FIGS. 18A, 18B, 18C, and 18D illustrate changes in the connector 1 and the connector unit 200C upon attachment of the connector 1 to the connector unit 200C in order in side view. FIGS. 19A, 19B and 19C illustrate states of change in the connector unit 200C at this time in order in top view.

In a standby state, the optical transmitter 21 of the connector 1 is contained in the optical unit housing 20, and the optical transmitter 51 of the connector unit 200C is contained in the optical unit housing 50 (FIGS. 18A and 19A). In a case where the connector 1 approaches the connector unit 200C, first, the electric unit housing 10 of the connector 1 is plugged into the electric unit housing 40 of the connector unit 200C. In a case where the connector 1 continues moving frontward, the front end of the plate-like member 230 is pressed against the front end surface of the connector unit 200C (the electric unit housing 40). At this time, in the connector 1, the plate-like member 230 moves rearward (the fulcrum 231B of each of the arms 231 in the hole 232 moves frontward), the arms 231 move the base member 22 frontward. Simultaneously, the optical transmitter 21 starts moving frontward via the elastic members 25 (FIG. 18B). In the connector unit 200C, in a case where the front end surface of the connector 1 is pressed against the protrusions 53C (the front ends of the moving members 530), the moving members 530 move rearward, and the arms 53A move the base member 52 frontward. Simultaneously, the optical transmitter 51 starts moving frontward via the elastic members 55. Further, in a case where the connector 1 is moved frontward, in the connector 1, the front end surface of the optical transmitter 21 is exposed from the opening 20K of the optical unit housing 20, and the front end section of the optical transmitter 21 including the lenses 212 and the position regulating unit 213 is disposed outside the optical unit housing 20 (FIG. 18C). Likewise, also in the connector unit 200C, the front end surface of the optical transmitter 51 is exposed from the opening 50K of the optical unit housing 50, and the front end section of the optical transmitter 51 including the lenses 512 and the position regulating unit 513 is disposed outside the optical unit housing 50 (FIG. 19B). Moreover, moving the connector 1 frontward causes the position regulating unit 213 of the connector 1 and the position regulating unit 513 of the connector unit 200C to be fit into each other, thereby performing optical transmission between the connector 1 and the connector unit 200C (FIGS. 18D and 19C). In a case where the connector 1 is removed from the connector unit 200C, an operation opposite to the above-described operation is executed. Thus, the optical transmitter 21 is contained in the optical unit housing 20, and the optical transmitter 51 is contained in the optical unit housing 50. The stroke (travel distance) of the optical transmitter 21 is, for example, 2.5 mm, and the stroke of the optical transmitter 51 is, for example, 3.5 mm. Both the optical transmitters 21 and 51 of the connector 1 and the connector unit 200C move in this manner, which makes it possible to reduce each of the travel distances. Accordingly, even in a case where the connector 1 and the connector unit 200C are coupled to a connected unit including no optical transmitter, it is possible to secure a sufficient evacuation distance. In other words, the connector 1 and the connector unit 200C easily insure backward compatibility. Moreover, deformation stress is easily applied to the optical transmission body such as an optical fiber due to movement of the optical transmitter; however, both the optical transmitters 21 and 51 move, thereby causing the deformation stress to be divided fifty-fifty and relieved.

(Workings of Connector 1 and Connector Unit 200C)

In the connector 1, in a case where the electric unit housing 10 is fit into the electric unit housing 40 of the electronic apparatus 2, the electric transmitter 11 of the connector 1 is connected to the electric transmitter 41 of the electronic apparatus 2 to perform electric transmission. In addition, as described above, the optical transmitter 21 and the optical transmitter 51 moves to perform optical transmission.

FIGS. 20A and 20B illustrate states before and after the position regulating unit 213 of the optical transmitter 21 is fit into the position regulating unit 513 of the optical transmitter 51 to perform optical transmission. Precise alignment of each of the plurality of lenses 212 to a corresponding one of the lenses 512 is performed by the position regulating units 213 and 513. At this time, the lenses 212 and 512 are disposed in the recesses 214 and 514; therefore, the lenses 212 and the lenses 512 are not in contact with each other. Both ends of the supporting unit 211 and both ends of the supporting unit 511 are in contact with each other, and space where the lenses 212 and 512 are disposed is hermetically sealed. If light (parallel light) is outputted from the electronic apparatus 2 (the lenses 512) in this state, this light propagates through the hermetically sealed space to be concentrated onto an end section of the optical transmission body by the lenses 212. Further, this light propagates inside the optical transmission body to be inputted into an electronic apparatus of another party connected to the optical transmission body. This applies to a case where an optical signal is inputted from the electronic apparatus of the other party to the electronic apparatus 2. Here, upon nonattachment, the optical transmitter 21 (or the optical transmitter 51) is contained in the optical unit housing 20 (or the optical unit housing 50), and upon attachment, the optical transmitter 21 moves, and the lenses 212 are exposed from the optical unit housing 20. Accordingly, upon nonattachment, the optical transmitter 21 is protected, which makes it possible to improve weatherability of the connector 1. This will be described below.

For example, in a case where the optical transmitter is exposed from the optical unit housing even upon nonattachment, the lenses of the optical transmitter are prone to receive stimulation from outside (disturbance), which may cause breakage of the lenses. For example, the lenses may be deformed or broken by reception of influences of humidity and temperature in addition to physical stimulation. The optical transmitter is more prone to breakage, and is lower in weatherability, as compared with the electric transmitter.

In contrast, in the connector 1 (or the connector unit 200C) according to the present embodiment, the link member 23 (or the link member 53) is provided, which allows the optical transmitter 21 (or the optical transmitter 51) to move in the frontward-rearward direction. Thus, upon nonattachment, the optical transmitter 21 is contained in the optical unit housing 20 (or the optical unit housing 50), and upon attachment, the front end section of the optical transmitter 21 including the lenses 212 and the position regulating unit 213 (or the front end section of the optical transmitter 51 including the lenses 512 and the position regulating unit 513) is exposed from the optical unit housing 20. Accordingly, it is possible to protect the optical transmitter 21 by the optical unit housing 20 upon nonattachment, which makes it possible to enhance weatherability of the connector 1.

As described above, in the present embodiment, the link member 23 is provided, which allows the optical transmitter 21 to move in the frontward-rearward direction, and makes it possible to protect the optical transmitter 21 by the optical unit housing 20 upon nonattachment. Accordingly, it is possible to enhance weatherability of the connector 1.

Moreover, the protective cover 24 (or the protective cover 54) is provided, which makes it possible to protect the optical transmitter 21 (or the optical transmitter 51) from the front surface upon nonattachment. Accordingly, even if irradiation with unintended light (laser) occurs, it is possible to prevent leakage of the light to outside, and it is possible to be easily compliant with safety standards of lasers as well.

Further, the optical transmitter 21 (or the optical transmitter 51) is connected to the base member 22 (or the base member 52) located behind the optical transmitter 21 (or the optical transmitter 51) by the elastic members 25 (or the elastic members 55), thereby relieving a physical impact on the optical transmitter 21. Moreover, it is possible to cope with displacement caused by variations in manufacturing, etc.

It is to be noted that the connector 1 (or the connector unit 200C) is allowed to be fit into a connector unit (a connector) including an optical transmitter that does not move. In other words, a design in which one optical transmitter moves and another optical transmitter is fit into the one optical transmitter without moving is enabled; however, both optical transmitters of a male connector and a female connector preferably move. This makes it possible to reduce the stroke of each of the optical transmitters, and by extension to relieve deformation stress applied to the optical transmission body such as an optical fiber.

In the following, description is given of modification examples and other embodiments of the present technology; however, components common to the foregoing embodiment are denoted by the same reference numerals, and description thereof is omitted.

Modification Example 1

FIG. 21 illustrates a configuration of a front surface of a connector unit (a connector unit 200C-1) according to a modification example 1. The protrusions 53C may be provided on the front end surface of the optical unit housing 50 as illustrated in the drawing. Accordingly, in a case where the male connector does not include the optical transmitter, the optical transmitter 51 does not move. Thus, upon attachment to the male connector including only the electric transmitter, an unnecessary impact is not applied to the optical transmitter 51, and an unnecessary exposure operation is not performed. In other words, backward compatibility is insured more reliably.

Second Embodiment (Configuration of Connector 3)

FIG. 22 illustrates a configuration of a main part of a connector (a connector 3) according to a second embodiment of the present technology. FIGS. 23 and 24 respectively illustrate configurations of a front surface and a side surface of the entire connector 3. FIGS. 22 to 24 illustrate a state in which the connector 3 is not attached to a connector unit (a connector unit 4 to be described later in FIG. 30). The connector 3 includes a slide-type housing 20B (a slide mechanism), and the slide-type housing 20B moves rearward (a direction away from the female connector, a second direction) to expose the front end section of the optical transmitter 21 including the lenses 212 and the position regulating unit 213 from the slide-type housing 20B. The connector 3 differs in this point from the connector 1 according to the foregoing first embodiment. In the present embodiment, the connector 3 corresponds to a specific example of a "connector (1)" of an embodiment of the present technology.

The connector 3 includes an optical unit housing 20A fixed to the supporting body 30 and a slid-type housing 20B that is movable in the frontward-rearward direction. The optical unit housing 20A is embedded in the supporting body 30, and a front surface thereof has an opening. The slide-type housing 20B is provided in the opening of the optical unit housing 20A. Upon nonattachment to the female connector, the slide-type housing 20B protrudes in the frontward direction from the front end surface of the supporting body 30 (the opening of the optical unit housing 20A).

FIGS. 25 and 26 respectively illustrate configurations of a front surface and a side surface of the slide-type housing 20B. The front surface of the slide-type housing 20B has an opening, and in a case where the slide-type housing 20B moves rearward, the optical transmitter 21 is exposed from the opening. A top surface, a bottom surface, and two side surfaces of the optical transmitter 21 are covered with the slide-type housing 20B.

The protective cover 24 covering the lenses 212 is fixed to the slide-type housing 20B. Accordingly, in a case where the slide-type housing 20B moves rearward, the front end surface of the optical transmitter 21 is exposed from the protective cover 24. Specifically, the upper section 24A and the lower section 24B of the protective cover 24 are respectively dragged by the top surface and the bottom surface of the slide-type housing 20B to move rearward. As described in the foregoing first embodiment, the protective cover 24 may be configured to open only one of upward and downward.

In place of the base member 22 of the connector 1, the connector 3 includes a base member 22A (FIG. 24).

FIG. 27, FIG. 28A, FIG. 28B, and FIG. 28C respectively illustrate configurations of a front surface, a top surface, a side surface, and a side surface in an arrow A direction illustrated in FIG. 28A of the base member 22A. The base member 22A includes a base section 22A-1 having a rectangular shape in front plan (top) view and extruded sections 22A-2 protruding in the frontward direction of the base section 22A-1. The base section 22A-1 is provided behind the optical transmitter 21, and is coupled to the optical transmitter 21 by, for example, an elastic member such as a spring. An impact to the optical transmitter 21 by physical stimulation is thereby relieved. Moreover, even in a case where a mutual positional relationship between the optical transmitter 21 and the optical transmitter (the optical transmitter 51 to be described later in FIG. 30) of the female connector is deviated due to variations in manufacturing, etc., it is possible to reliably fit the optical transmitter 21 and the optical transmitter of the female connector into each other by a pressure applied by the elastic member. The base section 22A-1 includes an L-letter like upper member 222A and a plate-like lower member 223A. The upper member 222A is bent frontward from a top surface thereof. The lower member 223A is disposed to face the top surface of the upper member 222A.

The extruded sections 22A-2 are provided at both ends of the base section 22A-1, and extend to both sides of the optical transmitter 21. The extruded sections 22A-2 play a role in moving a protective cover (the protective cover 54 to be described later in FIG. 32) of the female connector upon attachment to the electronic apparatus.

FIGS. 29A and 29B respectively illustrate configurations of the top surface and the side surface of the optical transmitter 21. The optical transmitter 21 of the connector 3 has a configuration similar to that of the optical transmitter 21 of the foregoing connector 1. The optical transmitter 21 of the connector 3 includes a position regulating unit 213A, and the position regulating unit 213A includes an end section of a pin 213P. The pin 213P is fixed to the base section 22A-1 (FIG. 27). In the connector 3, the optical transmitter 21 does not move; therefore, the pin 213P may be fixed to the optical transmitter 21. The position regulating unit 213A may include a recess, and a position regulating unit of the female connector may include a protrusion.

(Configuration of Connector Unit 4)

FIG. 30 illustrates a configuration of the connector unit 4 to which the connector 3 is attached. FIGS. 31 and 32 respectively illustrate configurations of a front surface and a side surface of the connector unit 4. The connector unit 4 has a configuration substantially similar to that of the connector unit 200C, but differs from the connector unit 200C in that the optical transmitter 51 does not move. The optical transmitter 21 of the connector 3 is inserted into the optical unit housing 50 of the connector unit 4 to perform optical transmission.

The connector unit 4 includes an interlock member 57 (a slide mechanism) to which the protective cover 54 is fixed (FIG. 32), and the interlock member 57 moves in the frontward-rearward direction to expose the front end surface of the optical transmitter 51 from the protective cover 54 upon attachment of the connector 3. In the present embodiment, the connector unit 4 corresponds to a specific example of a "connector (2)" of an embodiment of the present technology.

FIG. 33, FIG. 34A, FIG. 34B, and FIG. 34C respectively illustrate configurations of a front surface, a top surface, a side surface, and a side surface in an arrow B direction in FIG. 34A of the interlock member 57. The interlock member 57 includes an upper member 57U, a lower member 57D, and two side members 57S. For example, an elastic member such as a spring is coupled to a rear end of the interlock member 57, and the interlock member 57 is movable in the frontward-rearward direction. The upper member 57U and the lower member 57D have a rectangular shape in plan view, and are provided to face each other in an upward-downward direction. The upper member 57U and the lower member 57D are disposed behind the optical transmitter 51. The side members 57S are provided on both ends of the upper member 57U and the lower member 57D, and extend long in the frontward-rearward direction. Upon nonattachment of the connector 3, front ends of the side members 57S are disposed in front of the protective cover 54. In a case where the connector 3 is attached, the extruded section 22A-2 of the connector 3 is pressed against the front ends of the side members 57S to move the protective cover 54 rearward together with the interlock member 57.

(Attachment of Connector 3 to Connector Unit 4)

FIGS. 35A, 35B, 35C, and 35D illustrate changes upon attachment of the connector 1 to the connector unit 200C in order in side view.

In a standby state, the optical transmitter 21 of the connector 3 is contained in the slide-type housing 20B, and the optical transmitter 51 of the connector unit 4 is contained in the optical unit housing 50 (FIG. 35A). In a case where the connector 3 approaches the connector unit 4, first, the electric unit housing 10 of the connector 3 is plugged into the electric unit housing 40 of the connector unit 4. In a case where the connector 3 continues moving frontward, a front end of the slide-type housing 20B is pressed against the front end surface of the connector unit 4 (the electric unit housing 40). At this time, in the connector 3, the slide-type housing 20B starts moving rearward. Moreover, substantially simultaneously, in the connector unit 4, the extruded sections 22A-2 of the connector 3 are pressed against the front ends of the side members 57S, which causes the protective cover 54 to start moving rearward together with the interlock member 57 (FIG. 35B). Further, in a case where the connector 3 moves frontward, the optical transmitter 51 is exposed from the protective cover 54 (FIG. 35C).

Further, the connector 3 moves frontward, which causes the lenses 212 to be exposed from the slide-type housing 20B and be inserted into the optical unit housing 50 of the connector unit 4 (FIG. 35D). FIG. 36 illustrates a state of the connector 3 at this time. In a case where the position regulating unit 213A of the connector 3 is fit into a position regulating unit 513A of the connector unit 4, thereby performing optical transmission between the connector 3 and the connector unit 4. In a case where the connector 3 is removed from the connector unit 4, an operation opposite to the above-described operation is executed. Thus, the optical transmitter 21 is contained in the slide-type housing 20B. In the present embodiment, the lenses 212 are exposed by movement of the slide-type housing 20B; therefore, the stroke of the optical transmitter 21 is a distance from the base member 22A, and is 1.0 mm, for example. The stroke of the optical transmitter 21 is a stroke to apply a pressure, and in the connector 3, the optical transmitter 21 does not move by more than a stroke corresponding to the pressure. Accordingly, in the connector 3, it is difficult to insure backward compatibility. However, securing a sufficient distance from the base member 22A or performing a contrivance to eliminate distortion of the optical transmission body 21F makes it possible to have a longer stroke, which makes it possible to maintain backward compatibility.

In the present embodiment, the slide-type housing 20B is provided, which makes it possible to protect the optical transmitter 21 by the slide-type housing 20B upon nonattachment. This makes it possible to enhance weatherability of the connector 3.

Moreover, the optical transmitter 51 of the connector unit 4 does not move; therefore, it is possible to simplify the configuration. Accordingly, it is possible to reduce manufacturing cost. It is to be noted that the connector unit 4 may have a configuration similar to that of the connector 3, and the optical transmitter 51 may move to apply a pressure, and the optical transmitter 21 may not move.

Further, in a case where the male connector does not include the optical transmitter, the protective cover 54 does not expose the optical transmitter 51. Accordingly, backward compatibility of the connector unit 4 is reliably insured, and an unnecessary exposure operation of the optical transmitter 51 is preventable.

Third Embodiment (Configuration of Connector 5)

FIG. 37 illustrates a configuration of a front surface of a connector (a connector 5) according to a third embodiment, and FIG. 38 illustrates a configuration of a side surface of the connector 5. The connector 5 is a male connector and a plug, and includes the optical transmitter 21 and the electric transmitter 11 in one housing (an opto-electric unit housing 70). The opto-electric unit housing 70 is supported by a supporting body 71. In the present embodiment, the connector 5 corresponds to a specific example of a "connector (3)" of an embodiment of the present technology.

The optical transmitter 21 is provided in the opto-electric unit housing 70, and the electric transmitter 11 is provided on a further inner side than the optical transmitter 21 in the opto-electric unit housing 70. For example, in FIG. 37, the optical transmitter 21 is provided on a top side, and the electric transmitter 11 is provided on a bottom side. The optical transmitter 21 includes the supporting unit 211 and the plurality of lenses 212 arranged along the front end surface of the supporting unit 211. The lenses 212 are covered with the protective cover 74 upon nonattachment to a connector unit (a connector unit 6 to be described later in FIG. 41). The electric transmitter 11 includes the supporting unit 112 and a plurality of electrodes 111 embedded in the supporting unit 112. In the connector 5, an optical resin is also used for the supporting unit 112 of the electric transmitter 11. In other words, the supporting unit 211 of the optical transmitter 21 and the supporting unit 112 of the electric transmitter 11 include the same resin material, and the supporting unit 211 and the supporting unit 112 are integrated. As the resin material, for example, a resin for injection molding is usable. Accordingly, the supporting unit 211 is lower in aspect ratio, that is, larger in thickness than a configuration in which the supporting unit 211 is assembled as a component different from the supporting unit 112, which makes it possible to enhance molding shape accuracy and stiffness thereof. Here, the supporting unit 211 of the optical transmitter 21 is an example of a first resin molded unit of the present technology, and the supporting unit 112 of the electric transmitter 11 is an example of a second resin molded unit.

FIGS. 39A, 39B, and 40 illustrate configurations of the protective cover 74 and an interlock member 74A used to move the protective cover 74. FIG. 39A illustrates configurations of top surfaces of the protective cover 74 and the interlock member 74A, FIG. 39B illustrates configurations of side surfaces of the protective cover 74 and the interlock member 74A, and FIG. 40 illustrates perspective configurations of the protective cover 74 and the interlock member 74A. The protective cover 74 and the interlock member 74A are provided above the optical transmitter 21, and the lenses 212 are covered with the protective cover 74 from above. The protective cover 74 is formed in an arc shape in side view, and has a roll shape. The protective cover 74 is connected to the plate-like interlock member 74A. The interlock member 74A has a substantially rectangular shape, and is provided outside the opto-electric unit housing 70, specifically on the top surface of the opto-electric unit housing 70. For example, an elastic member such as a spring is coupled to a rear end of the interlock member 74A, and the interlock member 74A is movable in the frontward-rearward direction. In a case where the female connector is pressed against a front end of the interlock member 74A, the protective cover is pulled upward with rearward movement of the interlock member 74A to expose the lenses 212.

The opto-electric unit housing 70 includes a metal material. The opto-electric unit housing 70 is formable using one metal sheet, for example. The electric transmitter 11 and the optical transmitter 21 are embedded by one metal sheet on the basis of external shape references of the supporting units 112 and 211 to form the connector 5. Thus, surroundings of the optical transmitter 21 is encircled by the opto-electric unit housing 70 and the electrodes 111 of the electric transmitter 11; therefore, the optical transmitter 21 is protected, and is reinforced from both inside and outside by a metal having high strength. Accordingly, for example, the optical transmitter 21 is less prone to receive influences of deformation of the resin due to temperature change, swelling of the resin caused by humidity change, and the like.

(Configuration of Connector Unit 6)

FIGS. 41 and 42 illustrate a configuration of the connector unit 6 to which the connector 5 is attached. FIGS. 41 and 42 respectively illustrate configurations of a front surface and a side surface of the connector unit 6. The connector unit 6 includes the electric transmitter 41 and the optical transmitter 51 in an opto-electric unit housing 80. Although specific description is omitted here, a protective cover having a configuration similar to that of the protective cover 74 of the foregoing connector 5 may be provided in the connector unit 6.

(Attachment of Connector 5 to Connector Unit 6)

In a case where the connector 5 approaches the connector unit 6, first, the electric transmitter 11 of the connector 5 is inserted into the electric transmitter 41 of the connector unit 6. In a case where the connector 5 continues moving frontward, the front end of the interlock member 74A is pressed against a front end of the opto-electric unit housing 80 of the connector unit 6. Accordingly, the interlock member 74A moves rearward, and the protective cover 74 is pulled upward. Further, in a case where the connector 5 moves frontward, the lenses 212 are exposed from the protective cover 74 to face the lenses 512. Alignment of the lenses 212 and the lenses 512 is performed by the opto-electric unit housings 70 and 80. Thus, optical transmission is performed between the connector 5 and the connector unit 6.

In the present embodiment, the electric transmitter 11 and the optical transmitter 21 are contained in the opto-electric unit housing 70, which makes it possible to protect the optical transmitter 21 by the electric transmitter 11 together with the opto-electric unit housing 70. This makes it possible to enhance weatherability of the connector 5.

Moreover, the molding shape accuracy by the resin is enhanced as described above; therefore, shape accuracy of the opto-electric unit housing 70 formed on the basis of an external shape reference thereof is also further enhanced. Accordingly, it is possible to perform positioning of the optical transmitter 21 in addition to the electric transmitter 11 by the opto-electric unit housing 70. In other words, a position regulating unit only for the optical transmitter (for example, the position regulating unit 213 in FIG. 1) is unnecessary.

Further, the optical transmitter 21 does not move; therefore, it is possible to fit the optical transmitter 21 into the connector unit including no optical transmitter, and the optical transmitter 21 is resistant to breakage. In other words, in the connector 5, backward compatibility is insured.

Modification Example 2

FIG. 43 illustrates a configuration of a side surface of the connector unit 6 according to a modification example 2. A wiring board (a wiring board 81) may be built in a connector (such as the connector 1) or a connector unit (such as the connector unit 200C) including a receptacle as illustrated in the drawing.

An optical element 82 and a driving element 83 are mounted on the wiring board 81. The optical element 82 is, for example, a surface emitting laser (VCSEL: Vertical Cavity Surface Emitting Laser) or a photodetector (Photo Detector: PD), and the driving element 83 is, for example, a laser diode driver (LDD: laser Diode Driver) or a trans-impedance amplifier (Trans-Impedance Amplifier: TIA). An optical connecting member 84 used to perform optical connection from the optical transmission body to the optical element 82, that is, a so-called relay lens is provided in the connector unit 6. Light inputted from the connector 5 to the connector unit 6 enters the optical connecting member 84 through the lens 512. In the optical connecting member 84, a travel direction of the light having entered is changed to cause the light to enter the optical element 82. In the optical connecting member 84, for example, a mirror is formed.

As illustrated in FIGS. 44 and 45, the wiring board 81 on which the optical element 82 and the driving element 83 are mounted may be built in the connector unit 200C. FIG. 44 illustrates a state upon nonattachment to the connector 1, and FIG. 45 illustrates a state upon attachment to the connector 1. Upon nonattachment, the optical connecting member 84 is disposed at a position facing the wiring board 81, and upon attachment, optical connection is performed between the optical connecting member 84 and the optical element 82. In the optical connecting member 84, a mirror may be formed, and in a case where a distance between lenses is long, an optical transmission body such as an optical fiber may be built in an optical transmission path inside a member. Building the optical transmission body in the optical transmission path prevents light diffusion inside the member, and by extension, it is possible to enhance transmission efficiency of the optical connecting member 84.

As illustrated in FIG. 46, the wiring board 81 on which the optical element 82 and the driving element 83 are mounted may be built in the connector unit 4. A mirror may be formed in the optical connecting member 84, or an optical transmission body may be built in the optical connecting member 84.

Modification Example 3

A cross-sectional shape of the protective cover 74 may have recesses and protrusions, as illustrated in FIG. 47. For example, the protective cover 74 having such a shape is formable through forming slits by press processing. This makes it possible to increase a thickness of the protective cover 74, thereby improving toughness while maintaining flexibility. Likewise, cross-sectional shapes of the protective covers 24 and 54 described in the foregoing first embodiment and the foregoing second embodiment may have recesses and protrusions.

Although the present technology has been described with reference to the embodiments and the modification examples thereof, the present technology is not limited to the foregoing embodiments, etc., and may be modified in a variety of ways. For example, in the foregoing embodiments, a case where the connector 1, etc. are compliant with the HDMI (registered trademark) standards is exemplified; however, the connector 1, etc. may be compliant with any other standards.

Moreover, a combination of the male connector and the female connector is not limited to combinations described in the foregoing embodiments, etc. For example, in the foregoing second embodiment, a case where the male connector (the connector 3) includes the slide-type housing is described; however, the female connector (the connector unit 4) may include a slide-type housing.

Further, in the foregoing embodiments, etc., a case where the connector and the electronic apparatus are attached to each other is described; however, devices in the electronic apparatus may be connected to each other by the connector. Furthermore, the electronic apparatus may be any electronic apparatus other than the notebook personal computer. In addition, the connector may be, for example, a USB (registered trademark) memory with no cable, or the like.

Moreover, for example, the material and thickness of each component, the method and conditions of forming each component, and the like are not limited to those described in the foregoing embodiments, and each component may include any other material and have any other thickness, or each component may be formed by any other method under any other conditions.

Effects of the present technology are not limited to the effects described in the description, and may be other effects or may further include other effects.

It is to be noted that the present technology may have the following configurations.

(1)

A connector, including:

an electric transmitter;

an optical transmitter including a lens at an end of an optical transmission path;

a housing that is allowed to contain the optical transmitter; and a slide mechanism that attaches the lens to a connected unit at a position exposed from a front surface of the housing.

(2)
The connector according to (1), in which the slide mechanism causes the optical transmitter to move in a first direction toward the connected unit.

(3)
The connector according to (2), in which the slide mechanism comes into contact with a front surface of the connected unit to move the optical transmitter.

(4)
The connector according to (1), in which the slide mechanism causes the housing to move in a second direction away from the connected unit.

(5)
The connector according to (4), in which the slide mechanism comes into contact with a front surface of the connected unit to move the housing.

(6)
The connector according to any one of (1) to (5), in which the electric transmitter is provided outside the housing.

(7)
The connector according to any one of (1) to (6), in which a protective cover covering the lens in the housing is included.

(8)
The connector according to (7), in which the protective cover has a roll shape.

(9)
The connector according to (7) or (8), in which a cross-sectional shape of the protective cover has recesses and protrusions.

(10)
The connector according to any one of (1) to (9), in which the optical transmitter is coupled to a base member via an elastic member.

(11)
The connector according to any one of (1) to (10), in which
a receptacle is included, and
an electronic substrate on which an optical element and a driving element are mounted is built in the receptacle.

(12)
The connector according to (11), in which an optical connecting member from the optical transmitter to the optical element is included.

(13)
The connector according to (12), in which an optical transmission body is built in the optical connecting member.

(14)
The connector according to any one of (1) to (13), in which
the optical transmitter has a recess, and
the lens is provided in the recess.

(15)
A connector, including:
an optical transmitter including a first resin molded unit;
an electric transmitter including a second resin molded unit that includes the same resin material as the first resin molded unit and is integrated with the first resin molded unit; and
a housing that contains the electric transmitter and the optical transmitter.

(16)
The connector according to (15), in which the connector is a plug.

(17)
The connector according to (15) or (16), in which
the optical transmitter includes a lens at an end of an optical transmission path,
a protective cover covering the lens and a slide mechanism are included, the slide mechanism exposing the lens from the protective cover to attach the lens to a connected unit.

(18)
The connector according to any one of (15) to (17), in which the housing includes a metal material.

(19)
A connector, including:
an electric transmitter and an optical transmitter;
a protective cover that covers a front end surface of the optical transmitter; and
a slide mechanism that attaches the optical transmitter to a connected unit at a position exposed from the protective cover.

(20)
An electronic apparatus provided with a connector unit of a type opposite to a connector to be attached thereto, the connector unit including:
an electric transmitter;
an optical transmitter including a lens at an end of an optical transmission path;
a housing that is allowed to contain the optical transmitter; and
a slide mechanism that attaches the lens to a connected unit at a position exposed from a front surface of the housing.

(21)
An electronic apparatus provided with a connector unit of a type opposite to a connector to be attached thereto, the connector unit including:
an optical transmitter including a first resin molded unit;
an electric transmitter including a second resin molded unit that includes the same resin material as the first resin molded unit and is integrated with the first resin molded unit; and
a housing that contains the electric transmitter and the optical transmitter.

(22)
An electronic apparatus provided with a connector unit of a type opposite to a connector to be attached thereto, the connector unit including:
an electric transmitter and an optical transmitter;
a protective cover that covers a front end surface of the optical transmitter; and
a slide mechanism that attaches the optical transmitter to a connected unit at a position exposed from the protective cover.

This application claims the benefit of Japanese Priority Patent Application No. 2016-109980 filed with the Japan Patent Office on Jun. 1, 2016, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:
1. A connector, comprising:
an electric transmitter;
an optical transmitter including a lens at an end of an optical transmission path;
a housing configured to contain the optical transmitter;
a protective cover to cover the lens in the housing; and a slide mechanism configured to attach the lens to a connected unit at a position exposed from a front surface of the housing, wherein a cross-sectional shape of the protective cover has a plurality of recesses and a plurality of protrusions arranged alternatively.

2. The connector according to claim 1, wherein the slide mechanism is further configured to move the optical transmitter in a first direction toward the connected unit.

3. The connector according to claim 2, wherein the slide mechanism comes into contact with a front surface of the connected unit to move the optical transmitter.

4. The connector according to claim 1, wherein the slide mechanism is further configured to move the housing in a second direction away from the connected unit.

5. The connector according to claim 4, wherein the slide mechanism comes into contact with a front surface of the connected unit to move the housing.

6. The connector according to claim 1, wherein the electric transmitter is provided outside the housing.

7. The connector according to claim 1, wherein the protective cover has a roll shape.

8. The connector according to claim 1, wherein the optical transmitter is coupled to a base member via an elastic member.

9. The connector according to claim 1, further comprising a wiring board, and wherein an electronic substrate on which an optical element and a driving element are mounted is built in the wiring board.

10. The connector according to claim 9, further comprising an optical connecting member configured to connect the optical transmitter to the optical element.

11. The connector according to claim 10, wherein an optical transmission body is built in the optical connecting member.

12. The connector according to claim 1, wherein
the optical transmitter has a recess, and
the lens is provided in the recess.

13. A connector, comprising:
an optical transmitter including a first resin molded unit;
an electric transmitter including a second resin molded unit of a same resin material as the first resin molded unit, wherein
the second resin molded unit is integrated with the first resin molded unit, and
the integrated first resin molded unit has an aspect ratio lower than an aspect ratio when the first resin molded unit is assembled as a component different from the second resin molded unit; and
a housing configured to contain the electric transmitter and the optical transmitter.

14. The connector according to claim 13, wherein the connector is a plug.

15. The connector according to claim 13, wherein
the optical transmitter includes a lens at an end of an optical transmission path,
a protective cover configured to cover the lens;
a slide mechanism configured to expose the lens from the protective cover to attach the lens to a connected unit.

16. The connector according to claim 13, wherein the housing includes a metal material.

17. A connector, comprising:
an electric transmitter;
an optical transmitter;
a protective cover configured to cover a front end surface of the optical transmitter; and
a slide mechanism configured to attach the optical transmitter to a connected unit at a position exposed from the protective cover, wherein a cross-sectional shape of the protective cover has a plurality of recesses and a plurality of protrusions arranged alternatively.

18. An electronic apparatus, comprising:
a connector unit, of a type opposite to a connector, configured to be attached to the connector,
wherein the connector unit comprising:
an electric transmitter;
an optical transmitter including a lens at an end of an optical transmission path;
a housing configured to contain the optical transmitter;
a protective cover to cover the lens in the housing; and
a slide mechanism configured to attach the lens to a connected unit at a position exposed from a front surface of the housing,
wherein a cross-sectional shape of the protective cover has a plurality of recesses and a plurality of protrusions arranged alternatively.

* * * * *